US007739257B2

(12) United States Patent
Ellis

(10) Patent No.: US 7,739,257 B2
(45) Date of Patent: *Jun. 15, 2010

(54) SEARCH ENGINE

(75) Inventor: Gerard Ellis, London (GB)

(73) Assignee: Ivis Group Limited (GB)

( * ) Notice: Subject to any disclaimer, the term of this patent is extended or adjusted under 35 U.S.C. 154(b) by 788 days.

This patent is subject to a terminal disclaimer.

(21) Appl. No.: 11/333,647

(22) Filed: Jan. 17, 2006

(65) Prior Publication Data

US 2006/0184516 A1 Aug. 17, 2006

Related U.S. Application Data

(63) Continuation-in-part of application No. PCT/GB2004/003080, filed on Jul. 16, 2004.

(30) Foreign Application Priority Data

Jul. 17, 2003 (GB) .................................. 0316806

(51) Int. Cl.
*G06F 17/30* (2006.01)
(52) U.S. Cl. ..................................... 707/706; 707/708
(58) Field of Classification Search ..................... 707/3, 707/10
See application file for complete search history.

(56) References Cited

U.S. PATENT DOCUMENTS

| | | | | |
|---|---|---|---|---|
| 4,884,972 | A * | 12/1989 | Gasper | 434/185 |
| 5,404,295 | A | 4/1995 | Katz et al. | 364/419.19 |
| 5,768,578 | A | 6/1998 | Kirk et al. | 395/611 |
| 6,167,368 | A | 12/2000 | Wacholder | 704/9 |
| 6,480,835 | B1 * | 11/2002 | Light | 707/3 |
| 6,553,361 | B1 | 4/2003 | Compton et al. | 706/47 |
| 6,711,561 | B1 * | 3/2004 | Chang et al. | 707/3 |
| 6,714,905 | B1 * | 3/2004 | Chang et al. | 704/9 |

FOREIGN PATENT DOCUMENTS

EP 1 320 038 A2 11/2002

(Continued)

OTHER PUBLICATIONS

International Search Report , Oct. 15, 2004 (3 pages).

(Continued)

*Primary Examiner*—Baoquoc N To
(74) *Attorney, Agent, or Firm*—St. Onge Steward Johnston & Reens LLC

(57) ABSTRACT

A search engine for retrieving documents from a database comprising a semantic document editor that is operable to allow a user to edit an existing document by creating one or more searchable compound word that contains information contextually relevant to the contents of the document. The editor is operable to associate the one or more created compound words with the document to produce an enhanced document having the compounds words associated therewith. A database is provided for storing a plurality of enhanced documents and a semantic query editor is provided that is operable to enable a searcher to address the database of enhanced documents with a query. The query editor is operable to receive the query and convert it into one or more compound search word that contains contextually relevant information. A search module is provided that is operable to receive the searchable compound words and to locate the relevant enhanced documents that have compound words associated with the document matching the searchable compound words. An output means is provided for presenting any located documents to the searcher.

12 Claims, 23 Drawing Sheets

FOREIGN PATENT DOCUMENTS

WO        WO 00/77690 A1     12/2000
WO        WO 02/057959 A2     7/2002

OTHER PUBLICATIONS

Suryanto, H & Compton, P: "Discovery of Ontologies from Knowledge Bases" Proceedings of the First International Conference on Knowledge Capture, [Online] pp. 171-178, New York, NY USA ISBN: 1-58113-380-4 Retrieved from the Internet: URL:http://delivery.acm.org/10.1145/510000/500764/p171-suryanto.pdf?key1=500764&key2=7132405911&coll=portal&dl=ACM&CFID=2181828&CFTOKEN=68827537>[retrieved on Nov. 14, 2007].

\* cited by examiner

```xml
<Wine rdf:about="WineTempId_1"
xmlns:rdfs="http://www.w3.org/2000/01/rdf-schema#"
<barcode_ean>5000119661302</barcode_ean>
<description>Tesco French Red Wine 75cl</description>
<description_long>SMOOTH, GLUGGABLE, EASY DRINKING
RED. IDEAL FOR PARTIES, PICNICS AND
BARBECUES.</description_long>
<name>Tesco French Red Wine 75cl</name>
<price_rrp>13.62</price_rrp>
<price>13.62</price>
<produced_by>
<Winery>
<name>Castel Frares</name>
</Winery>
</produced_by>
<created_by>
<Winemaker>
<last_name>n/a</last_name>
</Winemaker>
</created_by>
<has_location>
<France_region />
</has_location>
<colour>RED</colour>
<release_date>NV</release_date>
</Wine>
```

FIG.3

```
wineWine
wineBarcode_ean
wineBarcode_ean5000119661302
wineDescriptionTesco
wineDescriptionFrench
wineDescriptionRed
wineDescription75cl
wineDescription_long
wineDescription_longSmooth
wineDescription_longGluggable
wineDescription_longEasy
wineDescription_longDrinking
wineDescription_longRed
wineDescription_longIdeal
wineDescription_longFor
wineDescription_longParties
wineDescription_longPicnics
wineDescription_longAnd
wineDescription_longBarbeques
wineNameTesco wineNameFrench
wineNameRed wineNameWine
wineName75cl
winePrice13.62
wineProduced_byProduced
wineProduced_byWinery
wineProduced_byWineryName
wineProduced_byWineryNameCastel
wineProduced_byWineryNameFrares wineCreated_byCreated
wineCreated_byCreated
wineCreated_byWinemaker
wineCreated_byWinemakerLast_name
wineCreated_byWinemakerLast_namen/a
wineHas_location
wineHas_locationFrance_region
wineHas_locationFrance_regionFrance
wineColour
wineColourRed
wineRelease_dateRelease
wineRelease_dateDate
wineRelease_dateNV
```

FIG.4

| | |
|---|---|
| Grape: | Cabernet Sauvignon and Merlot |
| Country: | AUSTRALIA |
| Region: | South Australia |
| Area: | Murray River |
| Producer: | Angove's Pty Ltd. |
| Stopper: | Natural Cork |
| Colour: | Red |
| Winemaker: | Jane Gilham |
| Alcohol Content: | 12% |
| Storage Instructions: | This wine can be drunk now but will further improve if carefully stored for up to 2 years |

FIG.6

| | | |
|---|---|---|
| Grape: | Cabernet Sauvignon and Merlot | |
| Country: | AUSTRALIA | see also books |
| Region: | South Australia | you may also be interested in South African |
| Area: | Murray River | |
| Producer: | Angove's Pty Ltd. | |
| Stopper: | Natural Cork | |
| Colour: | Red | |
| Winemaker: | Jane Gilham | |
| Alcohol Content: | 12% | |
| Storage Instructions: | This wine can be drunk now but will further improve if carefully stored for up to 2 years | |

FIG.7

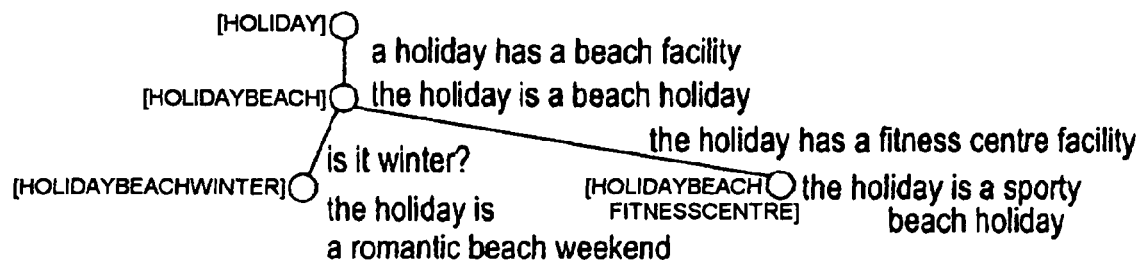
2110
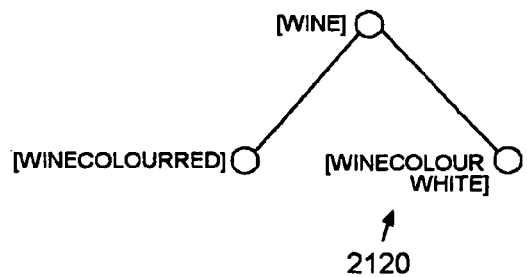
2120
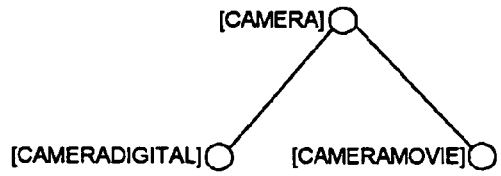
2130
FIG. 21

SEARCH ENGINE

CROSS-REFERENCE TO RELATED APPLICATIONS

The present application is a continuation-in-part of pending International patent application PCT/GB2004/003080 filed on Jul. 16, 2004 which designates the United States and claims priority of United Kingdom patent application 0316806.9 filed on Jul. 17, 2003.

FIELD OF THE INVENTION

The present invention is directed towards an improved search engine for on-line searching of specified websites, and more particularly, is directed to an improved semantic search engine.

BACKGROUND OF THE INVENTION

Traditional online search engines or information retrieval techniques focus on supporting general queries specified typically by a set of keywords. The objectives of the queries define specific information that satisfies that general query. The documents themselves are often indexed via keywords or collections of keywords requiring simple Boolean searching of the keywords entered by the user. These techniques form the basis of modern highly scalable Internet search engines.

The effectiveness of information retrieval is measured on such search engine in terms of both recall and precision effectiveness. Recall is a measure of ratio of relevant documents by precision to non-relevant documents, and is determined as a measure of the relevant documents retrieved within the set returned by the search engine. Search engines based on plain text use statistical models of association of words and relevance within documents and within document collections, but do not necessarily make use of the implicit semantic structure within a document.

Known strategies to increase effectiveness of existing search engines is to employ the use of parametric searching, which typically is used as an interface to a database query. Here, recall and precision can be significantly increased compared to plain text retrieval techniques. However, a problem with parametric searching is that the search page needs to be typically programmed per domain. For example, parametric searching is commonly used in car part search engines, whereby parameters such as manufacturer, make, model, year can be specified and allow the user to identify various keywords which can be searched by means of conventional Boolean searching. Additionally, as the schema of information changes within such domains these changes need to be propagated to the user interface, which to date, results in parametric searching being typically limited to use within a single domain.

Overall, current software search engines for either local system or Internet use are highly limited in their applications and functionality. As the number of available documents and the access to information continues to increase through faster and more powerful computers, search engines are required more accurately to sift through such information to pinpoint more accurately material that the user actually requires.

An important aspect of the present invention is the appreciation by the applicant that the use of document structure and semantics to contextualise the words found in each document allows the development of a strategy to increase significantly effectiveness of a search. This is possible due to the increase in documents moving from unstructured plain text through semi-structured documents to fully structured documents with underlying semantic meaning tied to ontologies and dictionaries of meaning and schematic control.

SUMMARY OF THE INVENTION

It is therefore an object of the present invention to provide an improved electronic search engine and strategy based on the principle of semantic searching and the searching of terms in context within target documents.

It is a further object of the present invention to provide a specific domain employing improved search facilities by use of a semantic search engine.

According to one aspect of the present invention there is provided a search engine for retrieving documents from a database, the engine comprising a semantic document editor that is operable to allow a user to edit an existing document by creating one or more searchable compound words that contains information contextually relevant to the contents of the document and associate the one or more created compound words with the document to produce an enhanced document having the compounds words associated therewith, a database for storing a plurality of enhanced documents, a semantic query editor operable to enable a searcher to address the database of enhanced documents with a query, said query editor being operable to receive the query and convert it into one or more searchable compound words that contains contextually relevant information, and a search module operable to receive the searchable compound words and to locate the relevant enhanced documents that have compound words associated with the document matching the searchable compound words, and output means for presenting any located documents to the searcher.

Hereinafter the reference to "compound word(s)" and "sub-compound word(s)" and the reference to "Big Word(s)" shall be taken to mean such compound words that contain information contextually relevant to the contents of the document or the search as the case may be, unless the context requires otherwise.

Preferably the document editor and the query editor are each operable to create compound words and sub-compound words derived from the compound words. The compound word or words may comprise a string of alpha characters, or a string of numeric characters, or a string of alphanumeric characters, or a code.

Preferably the search engine comprises:—
  a first module capable of recognising the semantic structure of a document and translating such semantic structure into compound words and their sub-compound generalised words and for associating this information with such document;
  a user interface with a second module for recognising the semantic structure of an input query and translating it into the required compound words and their sub-compound generalised words;
  a search module for undertaking a predetermined Boolean query based on a predetermined combination of the compound and the sub-compound generalised words associated with the query input against the compound words and their sub-compound generalised words associated with each document being searched;
  and a retrieval module for retrieving and temporarily storing those documents having compound words and sub-compound generalised words associated therewith and matching the predetermined Boolean query.

Alternatively, the search module may undertake a non-Boolean query, for example, applying information retrieval methods such as statistical, vector space models, coordinate matching, and inner product similarity.

Preferably there is provided a semantic rule engine that is operable to generate and store rules each of which includes one or more compound words derived from one or more of the enhanced documents, a semantic searching means that uses a selected enhanced document to generate one or more searchable compound words associated with the selected enhanced document, and search means for searching the rules to find one or more rules that contain both the one or more of the searchable compound words and one or more additional compound words, and means for adding to the selected enhanced document the additional compound words from the located one or more rules.

According to a further aspect of the present invention there is provided a method of retrieving documents from a database comprising the steps of:

(a) semantically editing a document to create one or more searchable compound words that contains information contextually relevant to the contents of the document;

(b) associating the one or more compound words with the document thereby to produce an enhanced document;

(c) storing the, or each, enhanced document in a database;

(d) providing a semantic query editor that is operable to receive a query input by a searcher, and using said query editor to convert the query into one, or more, searchable compound words, that contains information contextually relevant to the query;

(e) providing a search means to search the database, searching the database to match the one or more searchable compound words with compound words associated with a document and thereby locate specific documents in the database containing the compound search word or words; and (f) presenting the specific documents to the searcher.

The method may comprise the step of allowing a searcher (for example, the user) to select at least one compound word from a plurality of compound words produced in step (d) and conducting step (e) in respect of the selected at least one compound word.

Preferably step (b) comprises embedding the compound word or words in the document. Alternatively step (b) comprises forming a sub-document containing the compound word or words that is linked to the specific document.

Preferably there is provided a semantic rule engine that is operable to generate and store rules each of which includes one or more compound words derived from one or more of the enhanced documents, and the method comprises the steps of semantic searching a selected enhanced document to generate one or more searchable compound words associated with the selected enhanced document, searching the rules to find one or more rules that contain both the one or more of the searchable compound words and one or more additional compound words, and adding to the selected enhanced document the additional compound words from the located one or more rules.

Preferably the method comprises the step of recognising the semantic structure of a document and converting such semantic structure into compound words and their associated sub-compound generalised words for such compound and sub-compound words to be associated with that particular document, employing a second conversion operation for recognising the semantic structure of an input query and translating this semantic structure of an input query into required compound words and their sub-compound generalised words, undertaking a predetermined Boolean query based on a predetermined combination of the compound and sub-compound generalised words associated with the initial query input against the compound words and their sub-compound generalised words associated with each document being searched, subsequently retrieving and temporarily storing those documents having compound words and sub-compound generalised words associated therewith matching the required Boolean search parameters.

BRIEF DESCRIPTION OF THE DRAWINGS

Several preferred embodiments of the present invention will now be described, by way of example only, with reference to the accompanying illustrative figures.

FIG. 3 is an example of an extended Mark up Language (XML/RDF) Resource Description Framework product description of a particular wine;

FIG. 4 shows the canonical document sub-patterns derived from the document of FIG. 3 and converted into appropriate compound and sub-compound words in accordance with the present invention;

FIG. 6 illustrates a web page produced for a wine product;

FIG. 7 schematically illustrates the web page of FIG. 6 converted to a one-click search web page in accordance with the present invention;

FIG. 21 schematically shows a rule database arranged as ripple down rule trees;

DETAILED DESCRIPTION OF THE INVENTION

Figure 1:
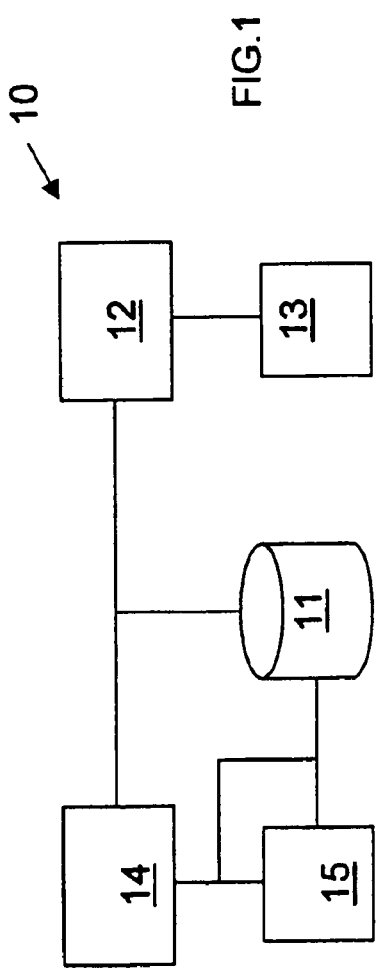
FIG. 1 is a schematic representation of a search engine constructed in accordance with the present invention.

The human brain, through million of years of evolution, is now capable of speech and word recognition and is also capable of automatically deriving semantic links between words. This provides an extremely effective way of analyzing the relevance of documents to the users specific search parameters. The present invention is an attempt to mimic this automatic semantic recognition and analysis of text to provide an improved and more efficient means of electronically searching an electronic document database. Basically, the semantic search engine of the present invention seeks not only to identify individual keywords within a document, but also to make use of document structure and the semantics of the terms used within that document to contextualise the words.

At present, attempts to enter a search query such as "which professor gave a talk at an ivy league school" seeking to match documents specifically such as "John—Sowa gave a seminar at Harvard" are not currently available, and existing search engines would be unable to find such required document (representative of low recall), whereas they may return alternative documents about "ivy plants" or "football", (representative of low precision). The present invention seeks to match concepts and structure of sentence, actors, agents, and other semantic links within the required search term.

The problem can simply be summarized as seeking to find the most general super-patterns (within documents typically), of a query pattern. Historically, the idea of semantically enriching an existing text document or even documents containing both text and visual indices has not been feasible. Thus the idea of utilising semantic searching has not been exploited since the primary requirement of producing or obtaining a large source of structured documents, having predetermined semantic links, has been extremely difficult, or very labour intensive. However, with the present invention, the semantic structure can now be automatically added by either authoring the information in a domain specific application, using a semantic editor, or by applying natural language-understanding tools to a document. These tools are now commonly available and can be used to translate semantically existing documents. These tools can also be used to translate semantically or construct the queries into an underlying knowledge representation.

Since all content is semantically addressable, semantically similar documents can be closely placed via such semantic links using the present invention.

Semantic similarity of documents can be computed either as a numeric value, a simplification, or as a maximal common sub-document/sub pattern. These sub-documents can also be stored and recorded against the generating documents. Consequently, similar documents have common parent sub-documents or are specializations of a sub-document. Similar documents to a specified document can then be retrieved by locally walking the hierarchy of documents from the specific document in the hierarchy. For example, a document about "John Sowa giving a presentation at an Harvard" would be similar to a document about "another professor giving a presentation at Harvard", or a document about "John Sowa giving a presentation at University of California at Santa Cruz". The maximal common sub pattern would be a "professor giving a presentation at a University".

Further, similar or interesting documents or categories of documents can be identified for a specific document, and rules written to compute these documents or categories with specific relationships associating those documents. For example, a document about "John Sowa giving a presentation at Harvard" may be linked to a document "John Sowa wrote the book 'Information Processing in the Mind and the Machine'" by "this person also wrote" relationship using a rule to associate people who gave presentations with books they wrote. These rules could be added by the scalable semantic enrichment part of this invention. These relationships such as "this person also wrote" could be identified as useful in the one-click search part of this invention for presentation of links to other documents as described herein later.

The present invention comprises recognizing the semantic structure of a document or query and translating it into compound words and their sub-compound generalised words, and associating this information with the document itself. Queries will then go through a similar process to formulate a semantic search.

Specific semantic editors (or translators) or natural language-understanding tools are available for translating from written language to written language and from voice to written language [examples are IBM Via Voice™ software and Lerner & Hauspie's Dragon™ or VoiceXpress™ software]. It may be necessary to train these systems to recognise compound words. Xdocs™ support in Microsoft Office™ is moving towards authoring of structured documents with increasing semantics, similarly Xmetal™ Word-like authoring environment for XML-based structured documents may find application in the present invention. There are also applications that work by transferring XML-based models (documents) and rendering them in HTML in a web application, and these may be useful in the present invention. These types of semantic editors can be incorporated into a specific semantic search engine so that each document within a predetermined or specifically identified database can undergo appropriate semantic translation. This provides a means of adding an associated semantic structure profile to each identified document in a database, comprising specific compound words and sub-compound generalised words to be associated with that document. These compound words and sub-compound generalised words can then be searched with greater accuracy and simple keyword searching.

Referring to FIG. 1 there is provided a search engine 10 comprising a computer for retrieving documents from a database 11. The engine 10 comprises a semantic document editor 12 that is operable to allow a user to edit an existing document by creating one or more searchable compound words that contains information contextually relevant to the contents of the document. The document editor is operable to allow a user to edit an existing document that is displayed on a display means 13. The document editor operates to associate the one or more created compound words with the document to produce an enhanced document having the compounds words associated therewith. A database 11 is provided for storing a plurality of enhanced documents. A semantic query editor 14 is provided. The query editor is operable to enable a searcher to address the database 11 of enhanced documents with a query. The query editor 14 is operable to receive the query and convert it into one or more searchable compound words that contains contextually relevant information. A search module 15 is operable to receive the searchable compound words to locate those relevant enhanced documents in the database 11 that have compound words associated with the document matching the searchable compound words. An output means is provided for presenting any located documents to the searcher.

Figure 2:
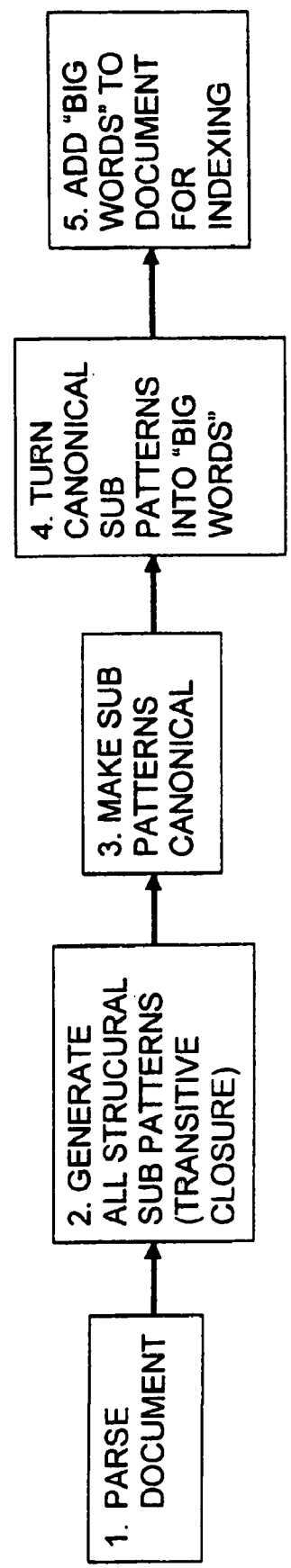
FIG. 2 is a schematic illustration of a flowchart of the semantic indexing of a document.

The semantic indexing of a document is illustrated schematically by the flowchart in FIG. 2. The Semantic Editor, is part of the Search Engine that does the generation of the compound words (hereinafter also called "Big Words"). The Semantic Editor is used to create documents or extend or enrich them. The document is preferably already in sufficiently structured form for the Semantic Search Engine to use it. The free text values for description could be further structured though. A Natural Language Processor or the Semantic Editor itself can do this.

The indexer traverses the document structure and accumulates the structural nodes as it walks to leaves of the tree structure, or more generally, the graph structure. The Big Words can be simply a concatenation of the labels on the structural tags. The structural nodes could be "<Wine><barcode_ean>5000119661302</barcode_ean>" to produce a Big Word "WineBarcode_ean5000119661302", for example. This means that different occurrences of the same Big Word in a document can be differentiated by semantic context, such as "WineDescriptionRed", "WineDescription_longRed", "WineNameRed", "WineColourRed" which can be used to differentiate finely the use of a word such as "Red" in a wine description, a long wine description, a wine name or a wine colour, Further these words differentiate the use of the word "Red" from "CarColourRed" which would be generated in a document about a car.

Further one can create bigger words other than simple triples, such as for example, "wineProduced_byWineryNameFrares", where "Frares" is a word associated with the name of a winery that produces a wine. This can continue to more deeply structured documents. (For example one can create bigger words by combining compound words, such as;
  "WineColourRedwineProduced_byWineryNameFrares"
    for Frares red wine.
By the same token, the list shown in FIG. 4, may include other combined compound words such as;
  wineColourRedwineHas_locationFrance_regionFrance
  wineColourRedwineRelease_dateNV
  wineColourRedwineProduced_by-
    WineryNameFraresCastelFrares etc).

Figure 5:
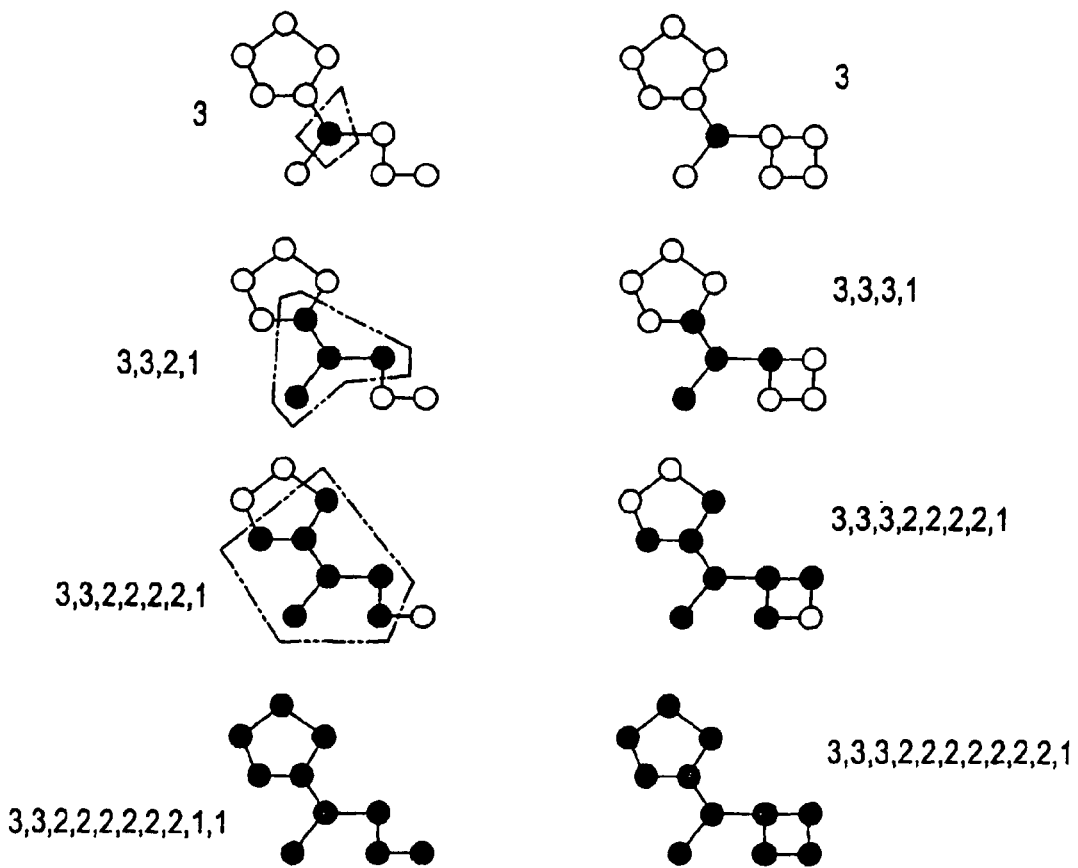
FIGS. 5 and 5a schematically illustrates two complex chemical structures and shows associated canonical representation for sub graphs with increasing radius of such structures for generating compound words in accordance with the present invention.
Figure 5A:
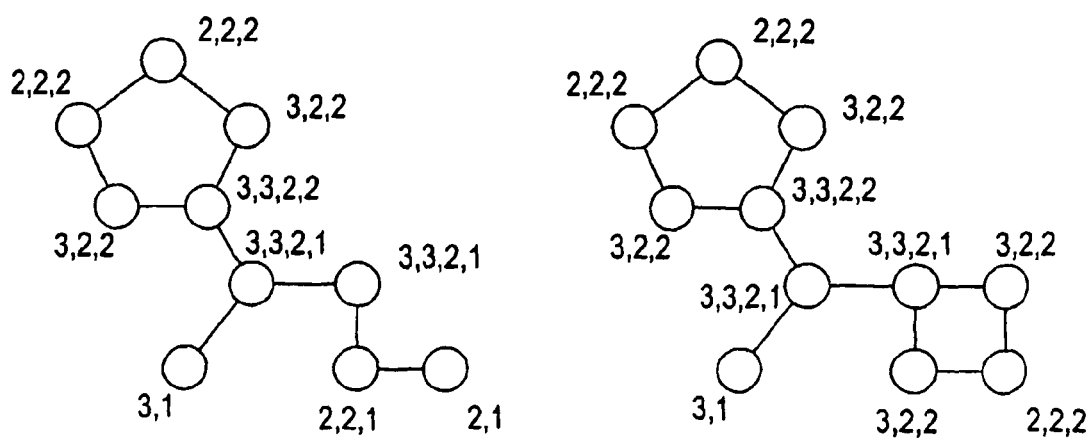
Figure 8:
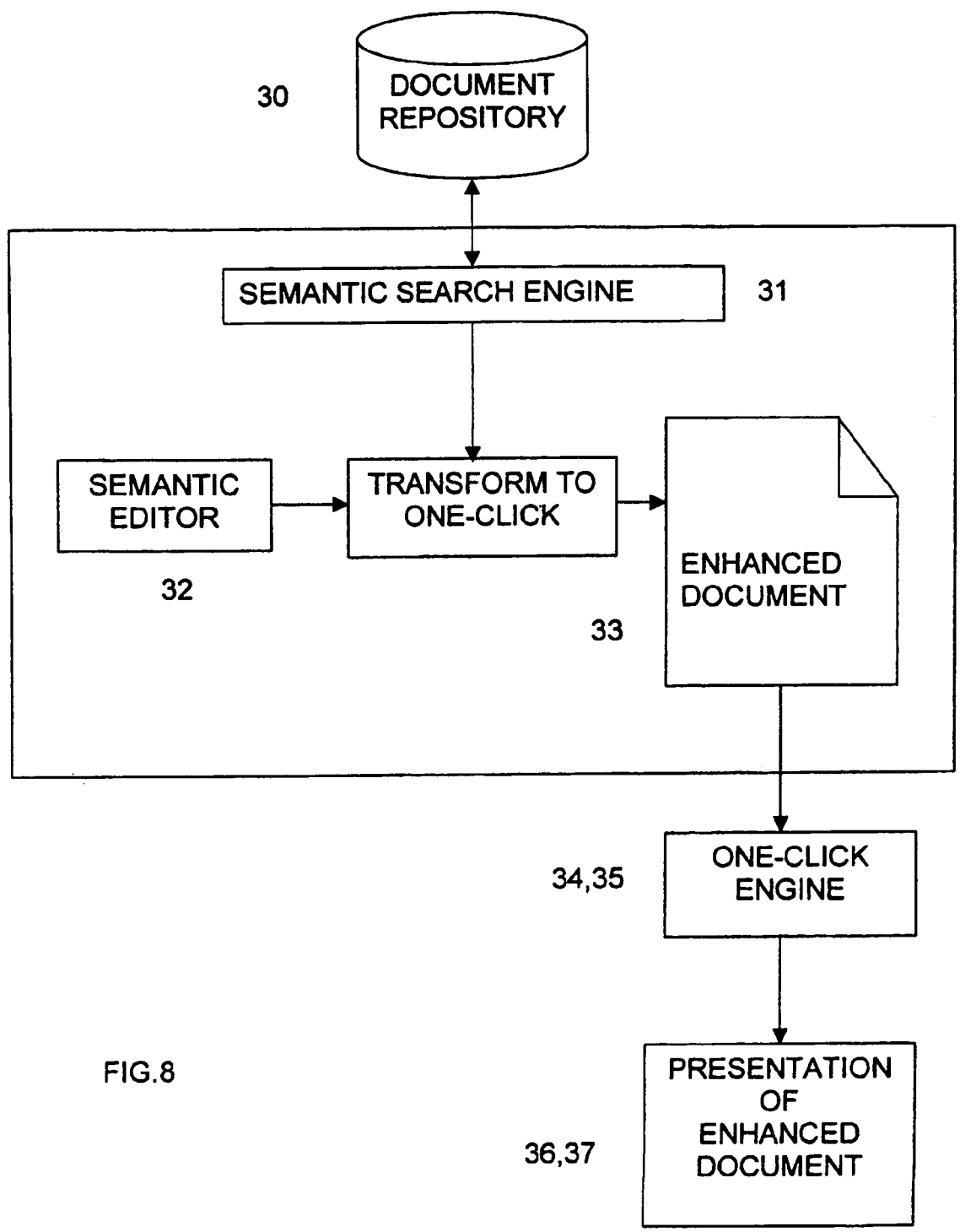
FIG. 8 is a schematic flowchart illustrating a deployment diagram of a one-click search engine.

The next step of making the words or paths canonical can be done in different ways, but each technique must be used consistently in the indexer that generates these Big Words to enable one to process the query into similar Big Words. A Big Word may be simple path order, or it can be a sorted list of node arities of a node and its neighbors to some given radius as shown in FIG. 5. "Arity" means the number of links or arcs attached to the node.

This indexing can be more readily understood with reference to FIGS. 3 and 4, whereby a conventional XML/RDF product description of a particular item (in this case a bottle of red wine) can be analysed so that the semantic translation will seek to recognise automatically the sub-structures of such document which can be derived from the representation of that document. From such a document, specific sub-patterns can be generated which are then converted into words. In this example, the Big Words are provided in natural language for convenience of interpretation of the invention. However the "Big Words" can be alpha numeric, numeric, encoded, or any other machine-readable format. These sub-patterns may simply be identified as Big Words that are more specific than each individual text item found in the original XML document. This provides for more specific and exact terms to be searched by use of this semantic search engine. Each of these Big Words can be considered to represent possible queries (i.e. words such as a "wineProduced_byWineryNameCastel", "wine produced by winery name castel"). The XML document of FIG. 3 allows for an improved search that is already a semantic translation, (or data plus a data schema at a minimum) as in XML.

The user can enter into the appropriate system a query such as, search for "red wines with name containing Tesco". This search request could then be semantically translated by the same, or an alternative, semantic editor to that used to translate the document text semantically, or by one of the other semantic editors previously discussed. The semantic editors produce structural documents, the search engine then takes those semantic documents and produces a set of Big Words to be applied in a traditional text search engine or database. Effectively, such a semantic query will go through the same structural and Big Word recognition translation that the documents go through in the indexing phase. The exact form of such structural and Big Word recognition is not of importance and can be readily varied as will be understood by those skilled in the art. This would result in, for example, the generation of an output as a conventional Boolean query such as:
  Boolean Query is: "wineNameTesco AND WineColourRed" An alternative Boolean query of a larger radius could treat it as one compound word for conjunctive queries, that is, for example the
  Boolean Query is: "WineColourRedWineNameTesco"

This Boolean query is then directed towards the canonical sub-patterns represented as the Big Words in FIG. 4, as opposed to against each individual text word in the original document. Since each of the Big Words is more specific, and an exact match is required by the Boolean search engine (again a conventional Boolean search engine can be employed), then the precision of the search is increased significantly such that only relevant documents will be determined. As a result, both precision and recall of the relevant base required by the specific semantic search query will be 100%, by effectively searching for much more specific terms than simply "Tesco, red and wine". The recall is supported by enriching relevant documents with the appropriate compound concepts.

Referring now to FIG. 5, such basic principles of semantic searching according to the present invention can be illustrated with regard to the searching of complex chemical compounds.

The present invention also realizes that words can be generated from structures that have no, or very little, word content normally associated therewith. Referring in greater detail to FIG. 5, there is shown a graphical representation of two similar chemical compounds. The specific chemical compounds displayed are irrelevant to this example, merely that they involve complex structures. At present it is very difficult to search through databases of such chemical structures using conventional techniques. However, within the scope of the present invention appropriate structure recognition engines is employed (such structure recognition engines are readily available and well understood by those skilled in the art) and work off the graphs that are encoded in some language. Chemicals, for example, are stored in a standard language that can be interpreted into such a graphical model. In FIG. 5 the Big Words are properties of nodes in the graph that can have formal graph-theoretic meaning.

As stated above, it is the semantic indexer (which is part of the search engine) that generates the Big Words. When translating chemical formulae of the type shown in FIG. 5, the indexer traverses the document structure and accumulates the structural nodes as it "walks" to the graph structure. The indexer generates "Big Words" as numerical words in the form of a sorted list of node arities of a node and its neighbors to some given radius. The Big Word can be simply a concatenation of the structural properties such as node arities (number of links or arcs attached to the node) of graph structural nodes in a radiating node description (of the type shown in FIG. 5).

These graphs could be coded in a number of different formats including the knowledge representation, Conceptual Graphs, or variants. These techniques apply equally to conceptual graphs generally and can be added to semantic graphs as an additional set of big words about the structure of the semantic graph. These big words can then be used in matching against queries which do not have specific words or content, but have similar semantic graph patterns. This is highly advantageous in noisy or obfuscated collections.

In this particular example, the abstract chemical structures shown can be represented by a collection of node neighborhoods. A node neighborhood is a structure implied by a boundary defined for a given radius of nodes from the first or primary node. There are many possible representations of such a structure. FIG. 5 illustrates each node represented as a set of node "arities" of itself and neighboring node arities in sorted order.

In FIG. 5, the compound representation on the left shows a canonical numeric descriptor of neighboring arities starting from radius 0 through 3 (i.e. the first representation and a radius of 0 simply finds the arities extending from the central node. The second representation also considers the number of arities from those nodes within a radius of 1 (i.e. from adjacent nodes the arity values being set in numerical order). Where two of the nodes have three arities, one of the nodes has two arities, and one of the nodes has one arity and so on). Also shown in FIG. 5 on the right representation of a very similar compound structure are the neighbor descriptors of a second super pattern. The primary descriptor for a node radius of 0 will be 3 representing a close semantic link between these two compounds. Since the two compounds shown in FIG. 5 are slightly different, then the canonical representations for such compounds are subsequently different with increase in radius.

The sub compound words of these Big Words are also generated. The words generated in FIG. 5 for two similar structures to increasing radii from a node show the sub words that also could be generated, so for example in the left side of FIG. 4, "3,3,2,2,2,2,2,2,1,1" has sub compound words "3,3, 2,2,2,2,1,1", and "3,2,2,1" amongst others. Note the Big Words shown in FIG. 4 are only of one particular node in the graph in each case of neighbor radius. The neighbor radius can be set for kinds of documents or more typically a small fixed radius is all that is necessary for most applications. "2,2,2", "3,2,2", "3,3,2,2", "3,1", "3,3,2,1", "2,2,1" and "2,1" are distinct Big Words that describe each node in the left graph to radius 1. So in a query the search for that structure would process that structure into a text query "2_2_2 AND 3_2_2 AND 3_3_2_2 AND 3_1 AND 3_3_2_1 AND 2_2_1 AND 2_1". The probability that a graph contains all of these keywords and is not a superstructure of the query is small (approaching zero), hence by using keywords we can do full semantic or structural matching over large collections of objects using readily available industrial strength search engine technologies to effect semantic search.

These words are associated (appended) to the main structural content of the document or chemical/graph. These additional Big Words are typically put in a separate tag so that they may be ignored when presenting the content, but are available to a search indexing for normal document word indexing and retrieval.

Having utilized the structure recognition engine to create a series of "Big Words" associated with each compound structure, since a semantic link can be created with a node radius of 0 the node arities are identical. However, by searching for a node within increasing radius it is seen that there is a distinction between the various Big Words of such chemical representations allowing a distinctive precise search to be carried out. The more detailed the numerical word being searched, the more likelihood of accuracy in determining the exact compound that is required.

Given a query containing big words $w1, \ldots, wn$ representing a query graph, then if the probability of a Big Word (w) in the collection is Pw, then the probability a graph in the collection has all these words is typically $Pw1*Pw2* \ldots Pwn$, if the Big Word recognition technique gives a useful word distribution. Note that the words themselves are necessarily interlinked even if Radius is 0, thus approximating the asking of the full graph-sub graph-match query. The increasing of the radius increases the size of the words (and hence the interrelatedness) and decreases the probability of the words occurring over a collection of graphs.

Just as recognition of sub-patterns in documents and queries can be used to generate Big Words for information retrieval indexing and querying, they can also be used for chemicals and other structures which have general graph structures such as noisy or obfuscated information. These mathematical structures are equivalent once encoded in a knowledge representation such as conceptual graphs.

Further, the techniques for rule search and interpretation discussed for documents can also be used for complex structures such as chemicals. The search is for indexing Big Words in the chemical structures which have been used in chemical reactant rules.

The storage of documents and indexing can use a traditional search engine such as those based on Boolean retrieval and inverted files, or alternatively, the design can be implemented on a relational database, by building the inverted files for "Big Words" over a document collection; or by other information retrieval techniques based on word to document analysis. The basic concept of developing a semantic search engine in accordance with the present invention allows significant enhanced search strategies and further product development within the field of electronic document searching. Examples of improved modifications will now be described.

A further modification of this embodiment of the present invention involves refinement based searching to sort into categories or compound words (Big Words) by traversing a kind of decision tree/graph/network. The decisions in the network are attribute value selections or attribute path value selections. For example, in a wine catalogue there are attributes such as wine colour, wine grape(s), wine country, wine region, wine maker, and wine price range. Values for the attribute wine colour include red, white, and rose. By selecting a wine colour red, this can be used to select all red wines, and then a restricted set of possible values for paths can be retrieved, so the user will only be able to select values that lead to non-empty searches/categories. A category can be seen as a set of attribute (path) value sets. For example, in red wine the user is presented with a refined set of grapes in red wines, such as Shiraz. Then the user is presented with countries that produce red Shiraz wine. There are a finite number of these possible searches over a given data set since it is a refinement or monotonically decreasing search. Also the order of the refinement does not affect the result of the current search. That is, if "wine grape Shiraz" is chosen then "red" is chosen the same result is achieved. These searches can be compiled into a database, so that they can be simply retrieved rather than computed by joins on attribute value sets over documents. The query then is a look up on encoded sets of attribute (path) value selections, that is, a kind of generalised document.

So for example, the following drill down "wine colour red, wine grape Shiraz, wine country Australia, wine region Hunter Valley, Wine Maker Peter Lehmann", incrementally produces the following document. This document is a basic schema for the category of "Peter Lehmann Hunter Valley Shiraz"

```
<wine>
    <colour>red</colour>
    <grape>shiraz</grape>
    <country>Australia</country>
    <region>Hunter Valley</region>
    <maker>Peter Lehmann</maker>
</wine>
```

The number of searches is polynomially related to the size of the document collection in complexity, that is the number of documents multiplied by the average number of attribute values. The complexity is reduced by only considering attribute values that have good discrimination value. An attribute value that is unique such as product id or barcode number in a product document is over discriminating, since a user must know the document already since is not really searching but is looking up. An attribute value that is common to all documents such as meta-attributes like the schema definition or encoding language are not useful either since they do not refine search.

The depth is self-limiting by the multiplication of probabilities of containing the attribute values (all less than 1.0). Also the search network can be controlled by not further refining small sets. These sets can be shown directly.

This compiled search/decision network can be generated top down or bottom-up. In a top down approach, attribute values that have good discrimination are placed at the first level. Then they are pair-wise added as children or refinements under each other. Duplicate path values are not considered and may be eliminated ("Australian wine which is shiraz" versus. "shiraz which is Australian".). The documents that have the parent path values are intersected. This second level is then intersected with sibling sets of path values (and their documents). This is then applied to grandchildren etc until the sets of documents for a given set of path values is less than or equal to some minimum size of resultant document set.

A top-down-bottom-up approach would insert a document into the various attribute value sets (categories) that are contained in it. This would be done top-down but driven per document (hence bottom-up). The document is reduced into a collection of discriminating attribute values.

A mixture of both these approaches is probably best, for example, get subsets of attribute path values to size three and put those into the network and index the document off them, then use a top-down pair-wise approach to finish off refinement of further searches. This could be done by repairing the children search by checking if the new document is also added to siblings. Path values are canonically ordered, for example, lexicographically (nested alphabetical), so "wine colour red" comes before "wine colour white" and both come before "wine grape merlot". Sibling path value sets differ in the last path value added. Only if the sibling already occurs do children combing the current and the sibling need to be done.

The end result of this is that, instead of carrying out complex queries involving joining sets of path values computed over a path value table, a set of path values is hashed on the canonical path value set name (ordered set of path values or path value ids) to select all documents which contain that pattern. So the above pattern for "Peter Lehmann Hunter Valley Shiraz" is canonically represented as "red Australian shiraz by peter Lehmann in Hunter Valley" by the Big Word "wineColourRedCountryAustralianGrapeShirazMakerPeterLeh    mannRegionHunterValley"

where each path is numbered, or coded as shown

```
<Wine>
    <colour>red</colour>              25
    <country>Australia</country>      38
    <grape>shiraz</grape>         99
    <maker>Peter Lehmann</maker>      101
    <region>Hunter Valley</region>    135
</wine>
```

Where each path is numbered, the full key for the pattern is 25-38-99-101-135. These codes can be looked up on a path table. This is a cheap operation involving a single lookup table and not expensive joins. The whole pattern of set of paths is then turned into the pattern key by appending the path key for each path in the pattern. Thus sub queries such as "red wine", "Australian red wine", "Australian Red Shiraz", "Peter Lehmann Australian Red Shiraz" would have keys "25", "25-38", "25-38-99", "25-38-99-101", respectively. Each document would be associated or indexed with its various virtual categories such as these and hence all documents in this category can be retrieved for this category via this key.

Refinement through categories such as selecting "Australia" as the country of the wine (path 38), then selecting the region "Hunter Valley" (path 135), then selecting "colour red" (path 25), then "grape Shiraz" (path 99), then the "wine maker Peter Lehmann" (path 101) would build up super category queries "38", "38-135", "25-38-135", "25-38-99-135", then "25-38-99-101-135", respectively. Each of these is a single select to find the paths which refine the particular category, or for finding the documents which contain that pattern.

Patterns such as the one below are the basis for multi-dimensional categorization and category-to-category relationships.

```
<Wine>
    <colour>red</colour>
    <country>Australia</country>
    <grape>shiraz</grape>
    <maker>Peter Lehmann</maker>
    <region>Hunter Valley</region>
</wine>
```

For example, consider a cross-sell relationship in retail merchandising which can be product-to-product, category-to-category, product-to-category, or category-to-product. These refined relationships can be built combinatorially from component cross-sell attributes. For example, cross-sell "wine colour red" with "wine colour white", cross-sell "wine country Australia" with "wine country New Zealand", "wine grape shiraz" with "wine grape Riesling", "wine region hunter valley" with "wine region South Island". So that the total cross-sell for the above pattern would be

```
<Wine>
    <colour>white</colour>
    <country>New Zealand</country>
    <grape>reisling</grape>
    <region>South Island</region>
</wine>
```

Similarly, if "wine grape merlot" were cross-sold to "wine grape chardonnay", then "Peter Lehmann Hunter Valley Shiraz" would be cross-sold with "New Zealand South Island Chardonnay".

With the refinement of the editor, knowledge acquisition for these specific cross-sell patterns can be refined or modified to sensible categories which contain a suitable (non-empty) number of products for cross-sell. Thus a relationship between fine-grain categories can be done via enriching a document.

```
<Wine>
    <colour>red</colour>
    <country>Australia</country>
    <grape>shiraz</grape>
    <maker>Peter Lehmann</maker>
    <region>Hunter Valley</region>
    <cross-sell>
        <Wine>
            <colour>white</colour>
            <country>New Zealand</country>
            <grape>reisling</grape>
            <region>South Island</region>
        </wine>
    </cross-sell>
</wine>
``` where the cross-sell sub-document/pattern is produced by composing the separate conclusions below

```
<cross-sell><Wine><colour>white</colour></wine></cross-sell>
<cross-sell>
    <Wine><country>New Zealand</country></wine>
</cross-sell>
<cross-sell><Wine><grape>reisling</grape></wine></cross-sell>
<cross-sell><Wine><region>South Island</region></wine></cross-sell>
```

Conventional web-based search engines generally consist of a text box for keyword entry and a "go" button to initiate query execution (so called "one-click" searching—in the present invention "one-click search" is associated with the ability to use document content as a search query directly, rather than entering information in a search box). Information retrieval effectiveness is duly measured in terms of recall and precision effectiveness as previously described.

Strategies to increase such effectiveness of searches have been to use the parametric search technique specifically as an interface to a database query. This has significantly increased the degree of recall and relevance compared to plain text retrieval techniques but has inherent problems in that parametric searches require that the search page must be programmed per domain necessitating specific parameter input whereby as the schema of information changes, those changes also need to be propagated to the interface. For this reason, parametric searching is conventionally limited to single domains. However, using the present invention, all content is potentially semantically addressable so that semantically similar documents are closely placed via semantic links.

In this context, a document contains relationships to a number of different concepts. Also there are implicit links to generalizations, specialisations and other closely related documents of a document. As shown, each concept or Big Word is itself a document which can be generalised or specialised, documents representing some of the biggest words in the database, where Big Words are arranged in a generalisation/specialisation hierarchy. Generalizations can be found by following a link that removes some piece of information in a document. Specializations can be found by adding some piece of information to a document, such as an attribute path value. Alternatively, sibling documents can be found by replacing some attribute value with an alternative value. This gives the user a way of navigating the generalization-specialization hierarchy over a number of documents. Allowing movement up, down or sideways in the semantic memory. Other relationships allow traversal to different domains.

For example, consider the following document describing Peter Lehmann Hunter Valley Shiraz wine.

```
<Wine>
    <colour>red</colour>
    <country>Australia</country>
    <grape>shiraz</grape>
    <maker>Peter Lehmann</maker>
    <region>Hunter Valley</region>
</wine>
```

A generalization link such as Hunter Valley Shiraz would be described by the following canonical sub-patterns.

```
<Wine>
    <colour>red</colour>
    <country>Australia</country>
    <grape>shiraz</grape>
    <region>Hunter Valley</region>
</wine>
```

A specialization link such as "year 1999" would lead to a specialized document "Peter Lehmann Hunter Valley Shiraz 1999" in the form.

```
<Wine>
    <colour>red</colour>
    <country>Australia</country>
    <grape>shiraz</grape>
    <maker>Peter Lehmann</maker>
    <region>Hunter Valley</region>
    <year>1999</year>
</wine>
```

A related link such as "maker Brown Brothers" would go to "Brown Brothers"

```
<Wine>
    <colour>red</colour>
    <country>Australia</country>
```

-continued

```
    <grape>shiraz</grape>
    <maker>Brown Brothers</maker>
    <region>Hunter Valley</region>
</wine>
```

This illustrates that every document has an exact and well-known position in the hierarchy of documents or semantic web. Further, these links never lead to dead ends since they are only present if other documents or sets of documents are present in the collection. In a one-click search the attribute path values in the document are treated as links themselves.

All documents contain schematic information. The present invention recognises that content within this semantic schematic structure can be employed for "single click" searching. For example, the word "red" in the context of the colour of a wine can then be used to specify schematically the semantic search for red wine. Here, an appropriate semantic editor can be employed to recognise that the term "red" when used in the schematic context relating to wine can produce a semantic search term such as "WineColourRed". This will effectively allow all content of a document to be used as a specific drill-down search for kinds of documents within similar domains or sub-domains. Alternatively, the Big Words they represent are the keys to more general categories. The major advantage of this particular development is that it allows semantic searching to be formulated by simply clicking on a word in a document, whereby an appropriate semantic editor will then create the appropriate semantic search term by not only recognizing the word, but associating with the word used in the specific context (i.e. the wine colour descriptor) so as to create an appropriate predetermined semantic Big Word as the search term. This allows every word, phrase or sentence in the document (not only the compound words) to be used as a hyperlink to a conventional search engine to undertake a semantic search as previously described against documents that have already been translated semantically. This allows considerable simplification of conventional searching whereby users no longer need to enter a variety of terms for Boolean searching so as to attempt to place a specific search word manually in context but can now simply derive and search on a word in its appropriate context derived from the user interface display. These search terms can be placed on the document, or alternatively to a side of the document as alternative links.

In addition, this prevents "dead-end" searching whereby a certain search strategy following a branched path will ultimately arrive at a dead-end document of no relevance, forcing the user to retrace their steps back up the tree or to recommence the search from start. By utilising the present invention as a one-click search, all documents are brought back on themselves as part of the semantic search since, of course, the specific document must have the semantic search term associated therewith. It always ensures that the user can carry on searching from a point of origin if required. Alternatively, they can be filtered, out or links with only themselves in it, need not be shown.

In addition, since each keyword, phrase or sentence can occur in many documents it is possible to identify in which of the other domain's semantic schemas that these "key words" exist. This will augment or position the content in its semantic address space. This means that one-click searches on keywords such as "red" can then also generate further links to be placed around the retrieved document, (by providing appropriate links on the user interface). For example, further links could be of the type "also occurs in dresses and paint". These then permit schematic searches into other domains related to dresses or paints. In its entirety, this provides for a rich experience in exploring semantic content.

This idea of one-click semantic searching will now be described in more detail with reference to FIGS. 6 to 9. An appropriate document in the form of an XML/RDF product description of a wine (similar to that shown in FIG. 3) is used as a display on appropriate web page providing details of that product. As shown in FIG. 6, a web page for a particular red wine is illustrated, providing details of that wine such as, for example, the grape, the country or origin, the producer etc. The present invention recognises that each of these terms should be searchable to allow the user to determine additional documents having not only those words but those words in specific context i.e. "Australia" in respect of the country for red wine or that a red wine has "12% alcohol content". It is also possible that the searcher may want to find wines with similar storage instructions, for example, a wine that can be stored for up to two years.

Conventional web pages do not provide this service or a capability and it would necessitate a conventional Boolean search to try and find the specific terms within similar documents with the inherent drawbacks of this type of searching as described above.

The present invention now provides an appropriate one-click engine to work in conjunction with, and sit in front of, the semantic search engine previously described. This one-click engine would effectively form a one-click search transformation on documents returned from the semantic search engine, as illustrated in the deployment diagram of FIG. 8. Here it will be seen that as a document is retrieved from the document repository (30) it is first passed through the semantic search engine (31) so as to undergo appropriate semantic translation by use of an appropriate semantic editor (32) and transformation into a semantically enriched document (33). This enriched document (33) then passes through the one-click engine (34) whereby the semantically enriched document (33) is transformed to an appropriate one-click structure (35) to generate an enhanced document (36) that is displayed on the user interface (37).

This enhanced document is schematically illustrated in FIG. 7 whereby each term that can be semantically searched is shown underlined. In practice, there is no necessity to underline the words than can be searched but it is illustrated here for clarity. In practice, the document of FIG. 6 has been semantically enriched within the semantic search engine by the development of all appropriate semantic "Big Words" which can then be associated with that document to produce the document of FIG. 7. The one-click search engine then identifies appropriate semantic search terms to be associated with each word displayed by the enhanced document (36) and to provide an appropriate hyperlink for that associated semantic term to a conventional search engine to allow either a conventional keyword or Boolean search of the semantic term against the semantically translated documents within the document repository.

For example, the term "Merlot" is used as an identifier of the specific grape, and thus the semantic editor will allocate an appropriate semantic search term such as "WineGrapeMerlot" or alternatively, the semantic editor may have simply allocated a more general term such as "WineMerlot" or "GrapeMerlot". It is also possible that the search engine (39) has been configured so that all three of these semantic terms can be used in a Boolean search or offered as alternative searches.

Alternatively, the proprietor of the website may determine that more specific and accurate searching is required by the end-user. In the present example the term "Australia" indicates the country of origin and is again a one-click search term that will have been semantically enhanced to a Big Word such as "WineCountryAustralia" or similar. It may be that the term "Merlot" is limited by a much larger Big Word such as "WineGrapeMerlotcountryAustralia". Obviously the more the content of the specific Big Word of the semantic term, the greater will be the accuracy in the document retrieved. In this example, if the semantic search term were "WineMerlot-CountryAustralia" only documents also having that semantic "Big Word" associated therewith would be found by the appropriate search.

Effectively, this invention allows each term within a displayed document on the user interface to be searched in context i.e. in relation to what specific feature that particular term (which is clicked) is describing or alluding to.

Each of the words can then be clicked on to allow the user to continue searching from this particular page rather than go back to the listing page or starting another keyword search.

A further enhancement of this one-click searching is also seen in FIG. 7 which shown on the right hand side of the display, next to the "Australia" descriptor within the field "country", other schemas that contain documents with specific related semantic links. For example, the term "Australia" used in context in the web page of FIG. 7, may derive different semantic terms through the semantic search engine, the first of which will be Big Words such as, for example, "VVineCountryAustralia" thus limiting any semantic searching to wines with the country classification of Australia. However, the semantic search engine may also be pre-programmed to develop a semantic search term "CountryAustralia", which is not limited to searching for wines with the country "Australia" but may determine other schemas (in this example "books") that will also have within their schema, country classifications including "Australia". The one-click search engine is programmed firstly to recognise that it is "wines" that are specifically being identified and thus the search is specifically for "Australian wines", but it may also recognise that the user may be interested simply in "Australia" and thus any other goods categories (schemas) which originate from Australia. This identifies and displays a separate searchable term "books" which has been passed through the one-click engine to be provided with appropriate semantic search terms such as "BooksCountryAustralia" which can be semantically searched by clicking on the term "books".

This information can be associated at the schematic level, that is to say, to all country attributes of wine, or it can be included as enrichment on documents using the semantic editors that allow fine grain rules to select appropriate other links as discussed in the section of controlling relationships between categories such as cross-sell or up-sell attributes.

Similarly, and as will be described in more detail below, an additional feature and benefit is also shown in the one-click web page shown in FIG. 7, namely, "you may also be interested in "South African". Here again, the appropriate semantic editor may also be programmed to identify semantically similar documents by comparing the semantic search terms against a semantic synonym (or hyponym) database. This semantic synonym database effectively provides a repository of semantically enriched synonyms that can either be automatically or manually input. For example, it may be determined by the web page host, that Australian wine is similar to South African wine, and thus a person searching for Australian wine may also be interested in South African wine. Thus, an appropriate synonym link is created in this semantic synonym database specifying "WineCountryAustralia" has, a semantic synonym "WineCountrySouthafrican". Thus, in this embodiment the one-click search engine will interact with the semantic search engine a number a times in order to assemble all the relevant information to build the one-click search page. Specifically, the semantic search engine is first empowered to retrieve an appropriate document having the appropriate semantic search term. The semantic search engine may then also be empowered by the one-click engine to undertake a semantic search on lesser defined semantic search terms such as (in this example) "CountryAustralia" so as to retrieve and identify different domains or schemas having associated therewith documents with the same semantic term (i.e. and in order to identify that the category "books" may also have information relating to the country Australia). Thirdly, the semantic search engine may also be empowered so as to analyse and identify appropriate synonyms from the semantic synonym database and to identify appropriate terms to be displayed on the user interface indicative of other search terms that could be of interest to the user, which in this example would be South African, which will have as an alternative country searching semantic big word associated therewith "WinesCountrySouthafrican".

Search engines typically use a stop-list to filter out words in a search query that commonly occur in most documents that are indexed. Examples of words typically in a stop-list include "the", "a", "an", "I". Any word that occurs in the stop-list is removed from the search query.

The creation of a one-click document allowing a search to be undertaken on any of the semantic links in such document may be described by the following process (see FIG. 9) through the one-click search engine:—

1) Find a document.
2) For each section in the document process it through one-click engine.
3) Take each section and break it down into word chunks.
   i) Check word is not in a stop list. If it is, ignore it.
   ii) Check whether words should be placed together into single clickable chunk. (For example John Smith would be clickable as a single item John Smith not as John and Smith individually. Alternatively, the attribute value path could be marked as searchable, as a chunk or parts to indicate whether it should be processed for one-click searching. This information would be stored at the document schema level and would apply across all documents fitting that schema.)
4) For each chunk of words, associate relevant semantic search with chunk.
i) Find the semantic area that the chunk of words currently appears in.
ii) Create a hyperlink associated with that chunk that has
   (a) has information about the current chunk,
   (b) contains the context in which the chunk appears,
   (c) contains the type of search to be run.
5) For each chunk locate the same concept in a different domain.
   i) Find all domains containing this concept.
   ii) Create an "also occurs in" hyperlink for these domains.
6) For each single word chunk look for similar words.
   i) Look up hyponyms for word chunk.
   ii) Look up synonyms for word chunk.
   iii) Find domains containing these hyponyms or synonyms.
   iv) Create a "you may also be interested in" hyperlink.
7) Provide enriched document.

It is to be appreciated that in the above steps one could use any class of relationships such as hyponyms, synonyms, antonyms, hypernyms, holonyms, meronyms, or others.

Effectively, this firstly identifies irrelevant terms such as "the" "and" and hence provides the enriched document as shown in FIG. 7. In this example, step 6 not only identifies the associated synonym but also provides an appropriate hyperlink so as to search on that associated semantic synonym if the user so requires.

In a further refinement, instead of the links containing search for words in a path, each attribute value path such as <wine><colour><red> could be marked up with a link to add the path identifier (for example 25 in this example) to the current search, for further refinement of the search or category that this document is in. This will get inserted into the canonical ordered code for the current search. So each document part is a searchable query, and can be added to an existing query content for refinement of that context.

```
<Wine>
    <colour>red</colour>                    25
    <country>Australia</country>      38
    <grape>shiraz</grape>            99
    <maker>Peter Lehmann</maker>          101
    <region>Hunter Valley</region>        135
</wine>
```

This means that one-click search can be made compatible with the dynamic search refinement discussed earlier.

The semantic searches associated with attribute path value words can be added to a current search context. So that if the current category or one-click drill-down search has resulted in "Red Australian Shiraz", then, in a wine document containing "Peter Lehmann", the search "Wine Maker Peter Lehmann" would be added to the current context to get the compound search term "Red Australian Shiraz made by Peter Lehmann". Further, given the context of "Red Australian Shiraz", then colour, country and grape would not be processed for clicking. Alternatively, they could lead to general categories. For example,

```
<Wine>
    <colour>red</colour>
    <country>Australia</country>
    <grape>shiraz</grape>
    <maker>Peter Lehmann</maker>
    <region>Hunter Valley</region>
    <year>1999</year>
</wine>
```

Figure 9:
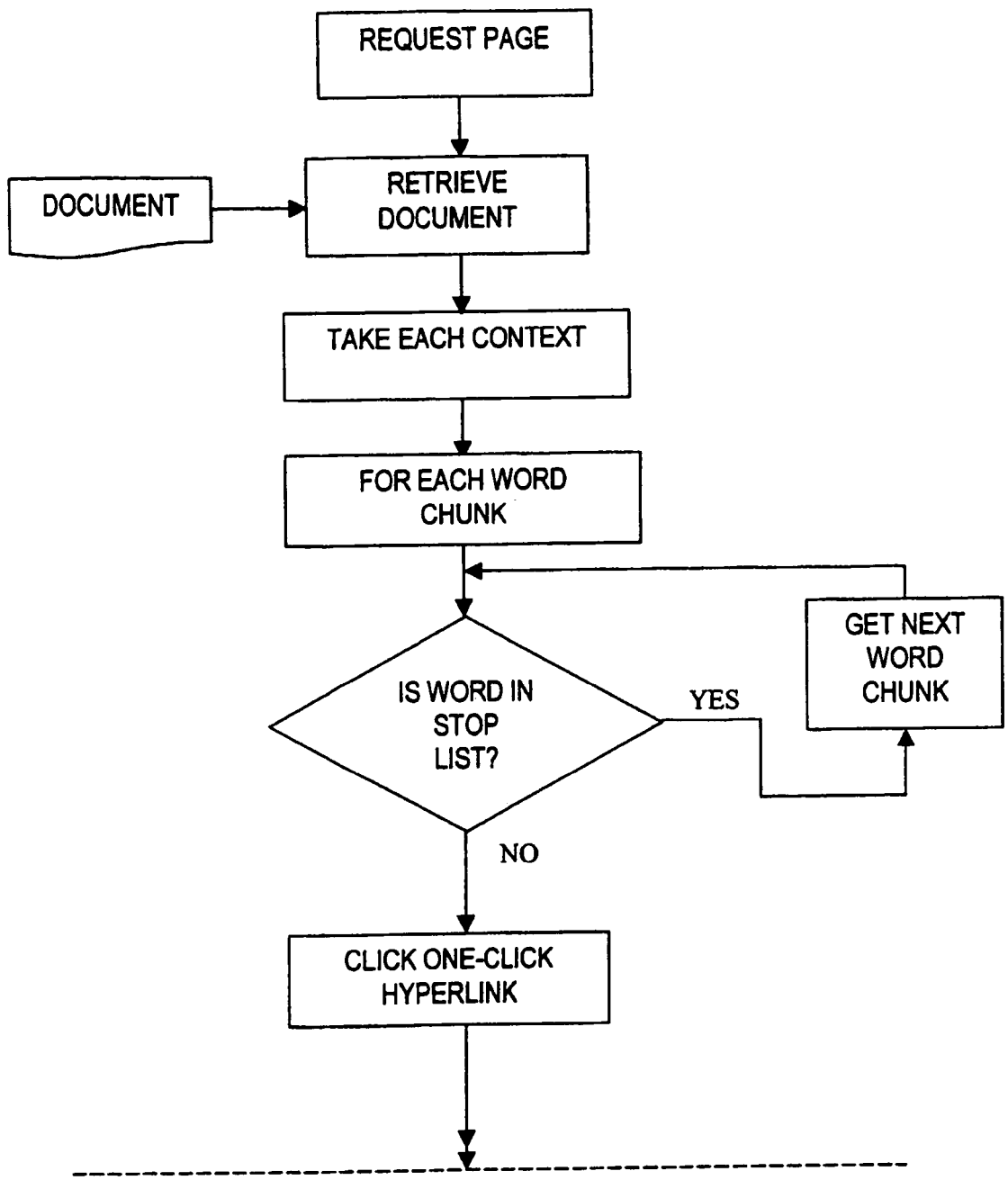
FIG. 9 is a flowchart schematically illustrating the one-click search process flow of FIG. 8.
Figure 9:
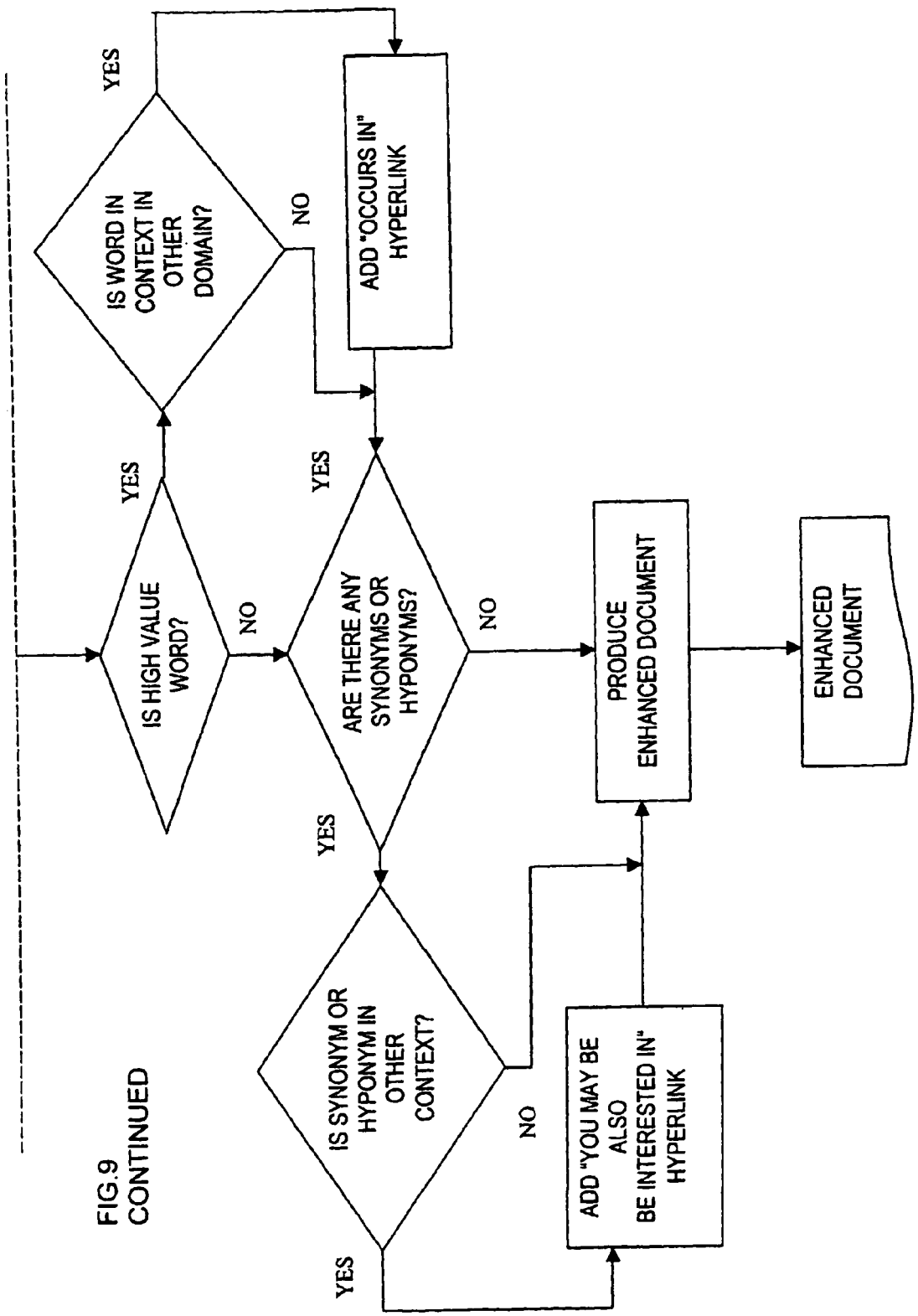

This process flow is shown in more detail in the flowchart of FIG. 9.

The use of the one-click search engine ensures that documents retrieved from the document repository and shown on the user interface (i.e. the computer screen) have been semantically enriched so that each relevant displayed term has at least one associated semantic compound word (or "Big Word") associated therewith. In this way, for the document displayed on the user interface, each term is effectively displayed in specific context. With reference to FIG. 9, a product view document will have specific product information. In this embodiment, the product is a holiday in Kenya with specific descriptors (sub schemas of "holiday") of the holiday, accommodation, hotel facilities etc. Due to the previous semantic enrichment by the one-click engine, any of the terms within the description will be effectively semantically enriched so that clicking on any of the accessible words or terms will identify that term in context. For example, clicking on the term "swimming pool" could have a semantic associated compound word of "HolidayKenyaHotelfacilitySwimmingpool". Thus clicking on this term, when using the one-click search engine previously described, would identify all Kenyan holidays having a swimming pool at the hotel facility because they will have the same semantic compound word within the semantically enriched document.

Overall, when an appropriate one-click entry is clicked, the process will proceed to the semantic search engine and contain sufficient information so that the search engine can perform the semantic search correctly. This allows the search to be carried out not only using the correct criteria but to use those criteria in the correct context as well as allowing for a much more efficient and refined search.

A further enhancement of the present invention, which is derivable from the basic concepts of the semantic editing of appropriate documents, is that of using Single-Step Semantic Translation and Standardisation in a Workflow.

Much of computer information processing is dedicated to template changes. Much of the interconnections performed in putting large computer systems and electronic commerce together involves mapping data from one schematic document, (typically an XML document) into another standard or required form.

Usually translation technologies are typically the domain of a skilled IT professional who will need to define requirements, problem, and data analysis, as an up-front series of actions so, that the source and destination schemas are defined. Usually a programmatic approach is taken to map the information from the source schema to the destination schema using technology such as XSLT (Extensible Stylesheet Language Transform). This solution approach follows a similar development cycle to that undertaken in normal software development. However, the problem of data standardisation is simply a special case of natural language translation like, for example, translation from English to French. Whilst translations of natural language present an even harder problem, concept mapping with a formal approach is achievable.

However, the maintenance of these translation programmes is highly problematic as there are many exceptions to the established rules, and they incur high cost over the lifetime of these programmes in terms of maintenance and upgrading. There is also the problem of timeliness of the maintenance because of the tie to software development cycles and IT deployment. Effectively, such existing translating programmes are very highly labour intensive and expensive and require specialist maintenance control and development and specialist IT personnel.

Additionally, the problem of mapping, for example, a purchase order from a customer into a standard internal purchase order, is also known to be highly problematic for a computer. A human operator does not find such an issue so problematic since that person has business knowledge that allows them to process readily the appropriate translation between different formats and thus readily handles exceptional cases that need operator involvement. An IT worker does not necessarily have this knowledge, or access to it, when developing such translation programmes that attempt to automate such translation from one form to another previously undertaken by human operators. This results in poor and ineffective translation programmes that struggle to adapt and deal with exceptional issues that do not follow predefined parameters. This has resulted in much of e-business still being carried out using facsimiles and printed documents, because of the advantages of human robustness over existing automated techniques.

Development of the present invention relating to semantic searching and semantic editing of documents has further enabled the applicant to develop processing tools which significantly increase the effectiveness of such automated translation programmes by utilising the semantic editing of existing documents.

This specifically allows the business users to be involved in a rule based construction of the translation directly into the workflow, such that the translation programme is effectively built by business users at the point of need (and not by IT specialists), and by such business users who understand, and have ready access to the business knowledge necessary to build such programmes. This allows rapid reaction to changed needs and handling of exceptional cases.

Simply providing a semantic attribute-to-attribute, value-to-value mapping interface using simple rules, will allow the rapid construction and maintenance of a programme by business users, thus avoiding the software development cycle and the involvement of expensive IT resources.

A further extension of this approach will be explained in more detail with reference to FIGS. 10 to 15 that relates to holiday information database.

In this embodiment of the present invention, it is further recognised that most web sites these days are required to be multilingual, accessed from users in many different countries, and require viewing in different languages.

Figure 10:
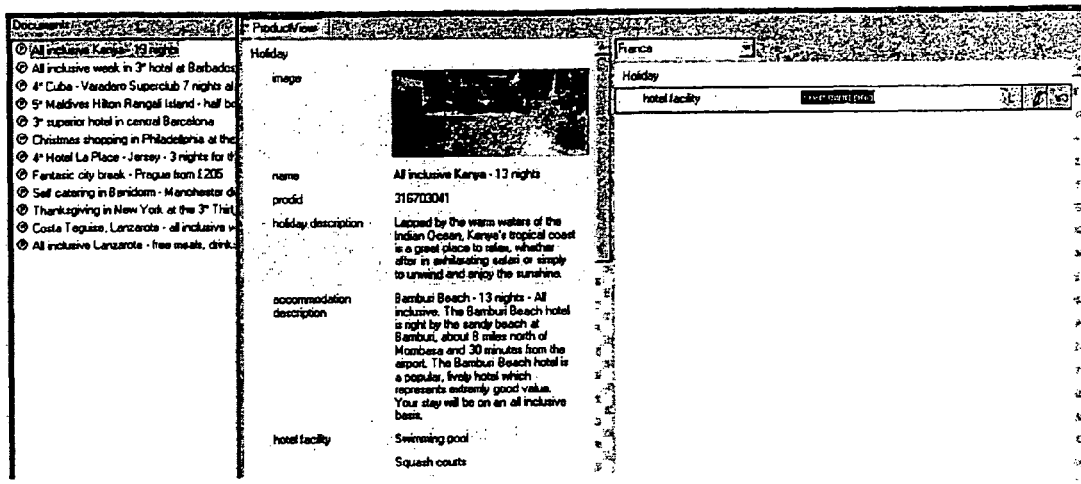
FIG. 10 is a user interface presentation in accordance with the present invention showing a holiday product document and translation facility.

Thus, in FIG. 10, the product view is shown in English language, although it is quite feasible that the proprietor of the website may wish his site to be viewed in French or another language in order that the may be able to entice potential purchasers or investors from other countries. For this reason, it is often important to effect translation of documents into foreign languages displayed on web pages. Historically, this has involved expensive and time consuming mapping applications that are difficult, time consuming and highly inflexible to implement. In the present embodiment, a specific semantic translation engine has been developed.

Figure 11:
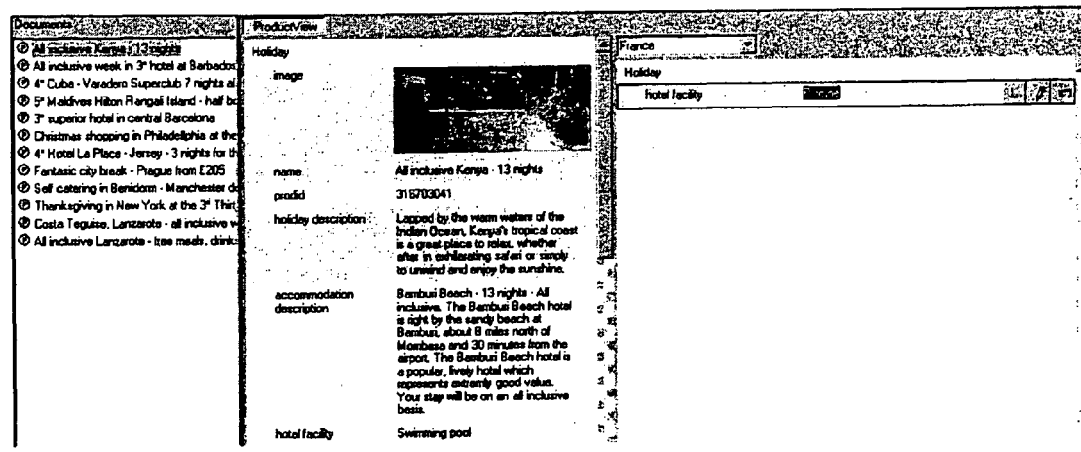
FIG. 11 is the presentation of FIG. 10 with the required translation effected thereto in accordance with the present invention.

In this embodiment, the semantic translation engine is effectively shown in the right hand of the product shown in FIG. 10. Here, a single line of text from the product view can be selected (usually by clicking on it in this specific translation engine) which displays that selected line in the right hand portion of the screen. For basic translation programmes, a commonly available electronic dictionary can be accessed to effect default language translation of either or all of the terms in this line into French. It is simply powered by a dictionary whereby the English words "swimming pool" would be translated to show "piscine" the proper French translation (as illustrated in FIG. 11). All the operator now needs to do is agree with the suggestion, or if applicable, enter a better or alternative translation. In its simplest form, this can be achieved by a single click on an appropriate acknowledgment button if the dictionary is correct in order to effect translation. Clearly (although not shown here) the remaining information displayed on screen would be translated in to the appropriate language (such as French in this example) as rules that apply to those attributes have been entered, or default translations done using some other tool.

The semantic translation engine is then able to undertake an appropriate semantic search for all semantically enriched documents containing the specific compound term in one natural language, (such as English) to search for "Holidays KenyaHotelfacilitySwimmingpool" and, once these documents have been selected, the approved foreign language translation of the English term "swimming pool" is effected to all those documents to create French translated versions thereof, of the Big Words, which, are used to access translated documents, enabling them either to be retrieved or created from the original document repository.

In an alternative version, this foreign language translation programme or rule may be further simplified to recognise that where the term "swimming pool" in relation to a hotel or facility is found in a product description, then thus will have the semantic compound word of "HolidayHotelfacilitySwimmingpool", and should a user request any document, in French, and the foreign language translation engine recognises that the requested document incorporates the English semantic term or Big Word "HolidayHotelfacilitySwimmingpool" then it will affect the automatic semantic translation of the term "Swimmingpool" within the particular field of "HolidayHotelfacility" so as to read "piscine". In this way, this specific translation rule can be associated directly with any request by a user to display documents in a specific or alternative language so as to effect automatically semantic translation of that document before it is actually displayed.

Figure 12:
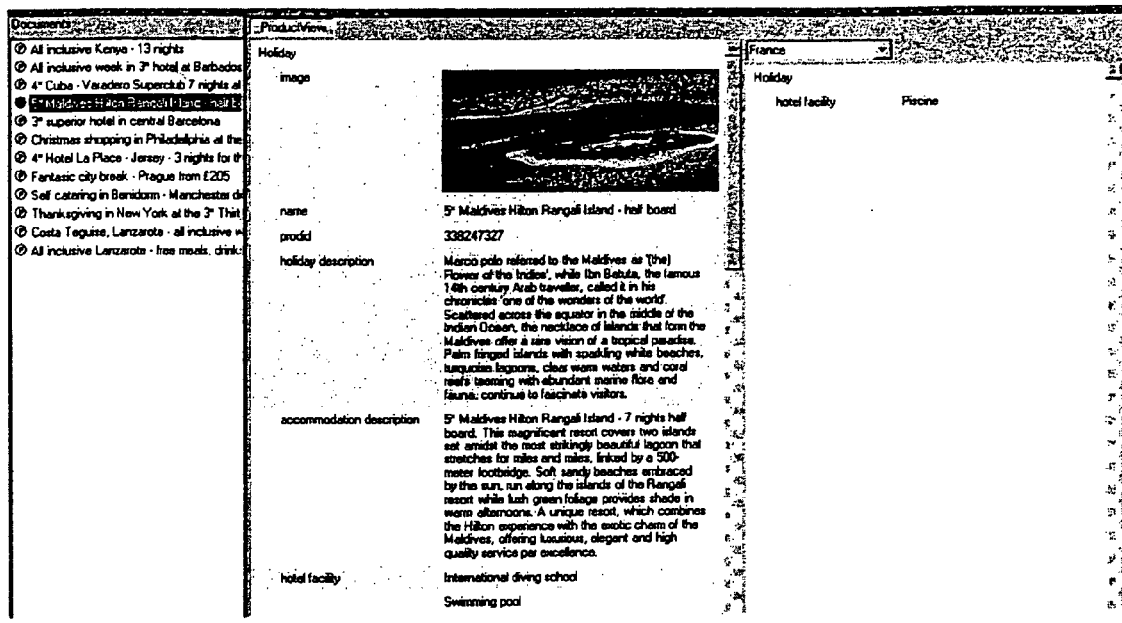
FIG. 12 is a user interface presentation in accordance with the present invention of a second product document automatically invoking the required translation rule of FIG. 10.

This is seen in FIG. 12 whereby, when a product view is brought up of a third holiday product (here in the Maldives), the semantic translation engine has already identified the holiday translation rule for application to this type of holiday document if it was requested to be displayed in French (in this example, only the hotel facility for swimming pools has been translated, but it will be appreciated that every term or phrase and displayed text can be so translated). This is specifically advantageous for terms that are commonly used for a range of similar products or documents such as business documents like purchase orders, or invoices.

Figure 13:
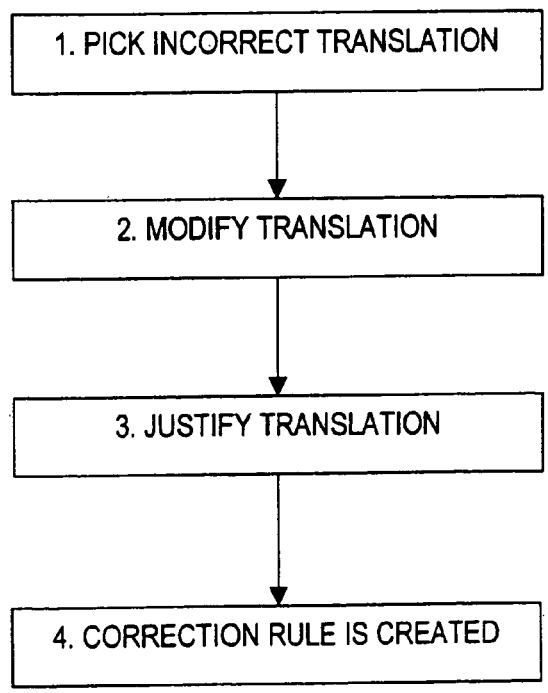
FIG. 13 is a flowchart of a process for modifying the translation rules employed in FIGS. 10 to 12 in accordance with the present invention.
Figure 14:
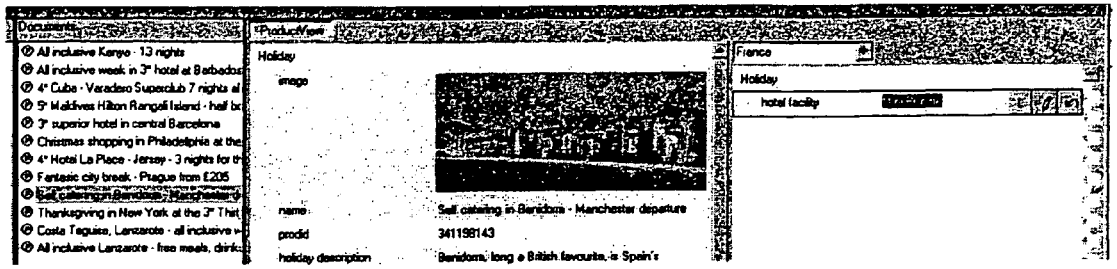
FIG. 14 is a user interface presentation in accordance with the present invention of a third product employing the modified translation process shown in FIG. 13.
Figure 15:
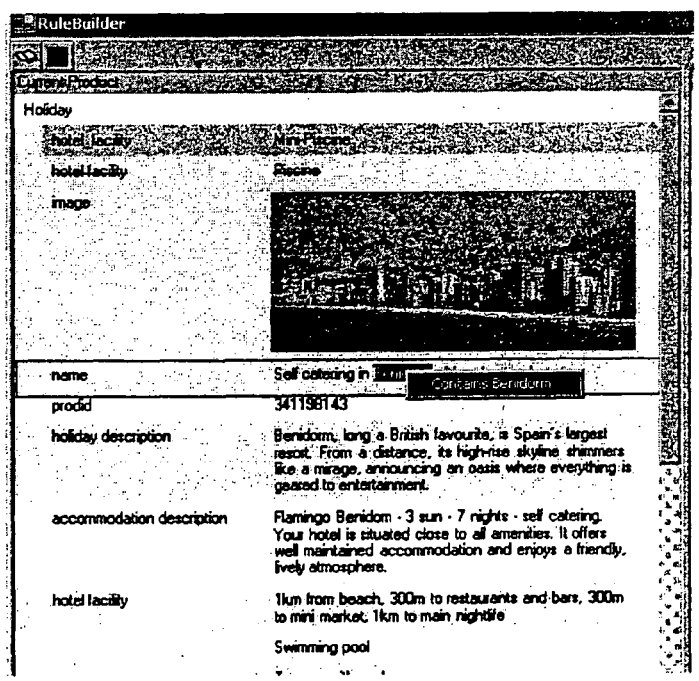
FIG. 15 is a user interface presentation in accordance with the present invention of a rule building programme utilising the process of FIG. 13.

Referring to FIG. 13, there is also provided a means of modifying such foreign language translation to be specific to particular scenarios. With reference to FIG. 13, for example, it has been determined that for holidays in Benidorm, "swimming pools" are referred to as "mini-piscine" when translated into French. Thus, the user, having identified this specific nuance of translation, is able to access any product relating to a holiday in Benidorm with a swimming pool within the holiday hotel facility (for example by use of semantic compound term "HolidayBenidormHotelfacilitySwimmingpool") and here instead of accepting recommended dictionary translation of swimming pool is able to enter a modification. However, this modified translation is then only applicable to documents containing the semantic compound word "HolidayBenidormHotelfacilitySwimmingpool" and such foreign language translation ("mini-piscine") will only be applied and displayed with such semantic terms when translated into French. The system is further provided with a comment box to explain the justification of the modified translation so that future users are able to discern why this particular translation varies from the primary translation rule created earlier. Clearly, the remaining displayed text is translated into the appropriate language.

This system provides a highly interactive and user friendly means of creating various language translation rules, together with simple base language explanations of those rules and how they are applied. Fundamentally, the key to this improved translation tool is the use of the semantic enrichment by the one-click engine and the semantic search engine which provide for semantic enrichment of the displayed document so that the terms used therein are recognised in specific context thus changing/translation of a word in a specific context is easily implemented across all documents where such word is only used in that specific context.

Thus, for instance, where the term "Swimming pool" is used in another context relating to a different product other than holidays, it would not automatically be translated the same when that document was requested in French for products other than holidays. Similarly, where users in different countries require different display of information than, for example, users from another country, the foreign language translation software may omit some translation for selected countries. For example, a US originating enquiry may not wish to receive details of swimming pools when enquiring about holiday accommodation, and thus here the language translation programme could be employed to omit the term "swimming pool" in relation to holidays if the enquiry originated from the US and was identified as such. Whereas, a similar enquiry from the UK may require details of a swimming pool, and that if UK originating enquiries were determined, reference to a "swimming pool" would be left in the product display.

Furthermore, whilst the foregoing description in relation to foreign languages of such semantic translation has been a reference to basic natural language translation, where the context permits, the term "translation" is intended to apply to any form of data manipulation, whether this be changing it from one natural language to another, or modifying the structure of the data, or simply providing a rule for manipulation of how that data is presented. As such, the present invention is not limited to the foreign language translation of terms/sentences but can be used for a wide variety of transformations of documents. Typically, these transformations are done when moving documents from one system to another. Further examples of these transformations are:

splitting a single line into multiple lines for display.
joining lines/fields into one.
removing lines/content of lines.
standardisation/reformatting e.g. "12.99£" becomes "£12.99"
calculation (e.g. currency conversions; a dollar currency or Euro currency field becomes a pound field and vice versa the numeric value is multiplied by the appropriate conversion rate which is either preset or determined from an external database).

In a further embodiment of the present invention, any product display having the term "price" and a "£" sign can be identified by an appropriate semantic compound word, and an appropriate rule applied to that compound word by the semantic translation engine so as to effect appropriate currency conversion. Alternatively, structures that encode this sort of information, for example such as below

```
<price>
    <unit>pound</unit>
    <amount>99.99</amount>
    <startDate>12/02/1999</startDate>
</price>
``` can be used as concepts for translation.

When a website is requested to be viewed in a different language, that specific language may then be used to identify the appropriate currency conversion protocol.

Additionally, the transformations do not need to be based on keywords or sentences; the use of the structure of the document, rather than the contents (eg. a holiday document with fields for "room facilities", can be transformed into one where they are called "hotel facilities"). Specific advantages of this type of translation programme become obvious when it comes to viewing the documents in different languages, but are equally applicable to modifying the nuances of document display so as to satisfy specific end users. Another example would be if one country required information on the type of beds in hotel room, as opposed to the external facilities, then again, the translation engine can be modified and preset to meet this requirement to display required information in the presented document fields when viewed under a specific language constraint.

Fundamentally, this allows the user, as opposed to an IT specialist, simply to implement new rules to translate specific words when used in context. Those words that are used in a specific context are identified by their specific semantic compound word associated with that term in that specific context. Basic display programmes for the user interface are easily implemented (and will be considered standard within the art) to allow the user to effect such simplistic rule construction. The means for providing associated text box with each instruction or rule provides a very user friendly system which is readily understood by a non-IT specialist but by someone who has specialist knowledge of the required translation, thereby allowing real time upgrading and modification of the database documents. The rules themselves can then be established so as to sit over the documents recalled from the document repository so that the documents themselves remain unchanged and such rules are applied prior to visual display at the user interface so that the translation is merely temporary for visual display. Alternatively, the rules may be applied to create permanent translated documents for storage in the, or another, document repository that could allow indexing over the translated content.

The production of large quantities of semantically rich information necessarily involves large numbers of specialist knowledge workers. Typically this is done in document management systems that capture the edits that workers make to documents. However, they do not capture the knowledge needed to automate those edits. This results in knowledge lost over time as staff turnover. Also it is a lost opportunity for training new staff. Further, having a largely automated way of producing rich documents, allows greater scale and efficiencies in production.

This knowledge about why changes are made to documents is an important core asset of an organisation, but organisations fail to capture it. If the knowledge can be captured in a computer processable format, it can be used to automate and scale up the production of that semantically rich information and provide increased richness.

The present invention entails the placement of knowledge acquisition technologies that are useable by non-IT workers in a multi-level multi-flow workflow of document processing. By breaking down information production into tasks to be performed by specialists, and capturing their knowledge used to do their task, a highly adaptive computer system can be developed which can automatically transform input documents into highly semantically enriched documents without the need to employ IT specialists to build the semantic rules or query structures.

An example of how to capture this knowledge is to track the activities of users of the system. There are two main activities by users when acquiring this knowledge, the first is validation or correction of enriched content, the second is justification of the correction or edit so that a rule can be constructed as shown in FIG. 16b. The validation step requires that data presented to a user is already enriched by the rule base. The user then either corrects or confirms the interpretation of the document by the rule base. As the knowledge base matures, an increasing percentage of the documents require no correction. Those that are corrected are example documents which can be used for building rules to correct the knowledge base.

The task of enrichment correction and rule building can be asynchronous tasks performed by separate people. One rule building user can support the validation or correction users inversely proportional to the correction rate.

The correction activity can be embedded into existing applications that would allow editing of the enriched documents. These can be document editors, or application forms.

The following is an overview of Adaptive Multi-level Multi-flow Semantic Enrichment as used in the present invention.

The workflow system of the present invention automates the creation of document enrichment transforms (an automated transform that is monitored by a user). The workflow system is the equivalent to the manual document enrichment performed by subject matter experts. The individual activities associated with document enrichment are decomposed into a dynamically configurable workflow. Activities are assigned to subject matter experts. Knowledge acquisition technologies built into the editing tools used to enrich the documents automate the knowledge capture required for the creation of the Enrichment Transform. By performing their normal activities, non-IT experts in a workflow, capture their collective knowledge to create an equivalent automated enrichment transform business asset.

A document is some text represented usually in some standard format such as extended Markup Language (XML) or Conceptual Graph Interchange Format (CGIF). A document can be structured, semi-structured or unstructured. As documents are enriched they usually become highly structured documents.

The fundamental building block in a workflow system is an activity. An activity is a unit of work needed to process a document. Examples of activities could include standardisation of terms in documents, enriching with new terms, translating terms to other languages, organising or classifying documents, and formatting documents for presentation or to publish documents. A workflow activity represents a particular subject matter expert's role in an organisation as far as document processing is concerned. An activity has an input port and an output port for documents, which is like a users in-tray and out-tray. The activity automatically enriches a document based on previous knowledge gathered by interacting with the user whilst enriching similar documents. As each piece of new enrichment is encountered the user is requested to provide a reason for the change. The system guides the user to select reasons about the current document being changed and others that are similar or negative reasons about dissimilar documents. As noted previously, this justification process can be done asynchronously from the correction.

The expert's role is to approve the automatically enriched document or to edit the enrichment and provide reasons for changes. This builds up a large knowledge base over time. Documents that have their enrichments changed and consequently obtain reasons for change are termed "learning" documents. These documents are examples that are used to create knowledge. They can be shared with other subject matter experts to guide the creation of their knowledge bases. These learning documents are the basis of expertise in the document-processing task and are a fraction of the documents that are seen or experienced. By organising activity nodes into hierarchies, a concentrated stream of these learning cases can be produced, magnifying many years of experience into one year. Learning documents tend to be hundredths of the total document source, so an expert can get a hundred years' experience in a year by working just with learning documents.

Figure 16:
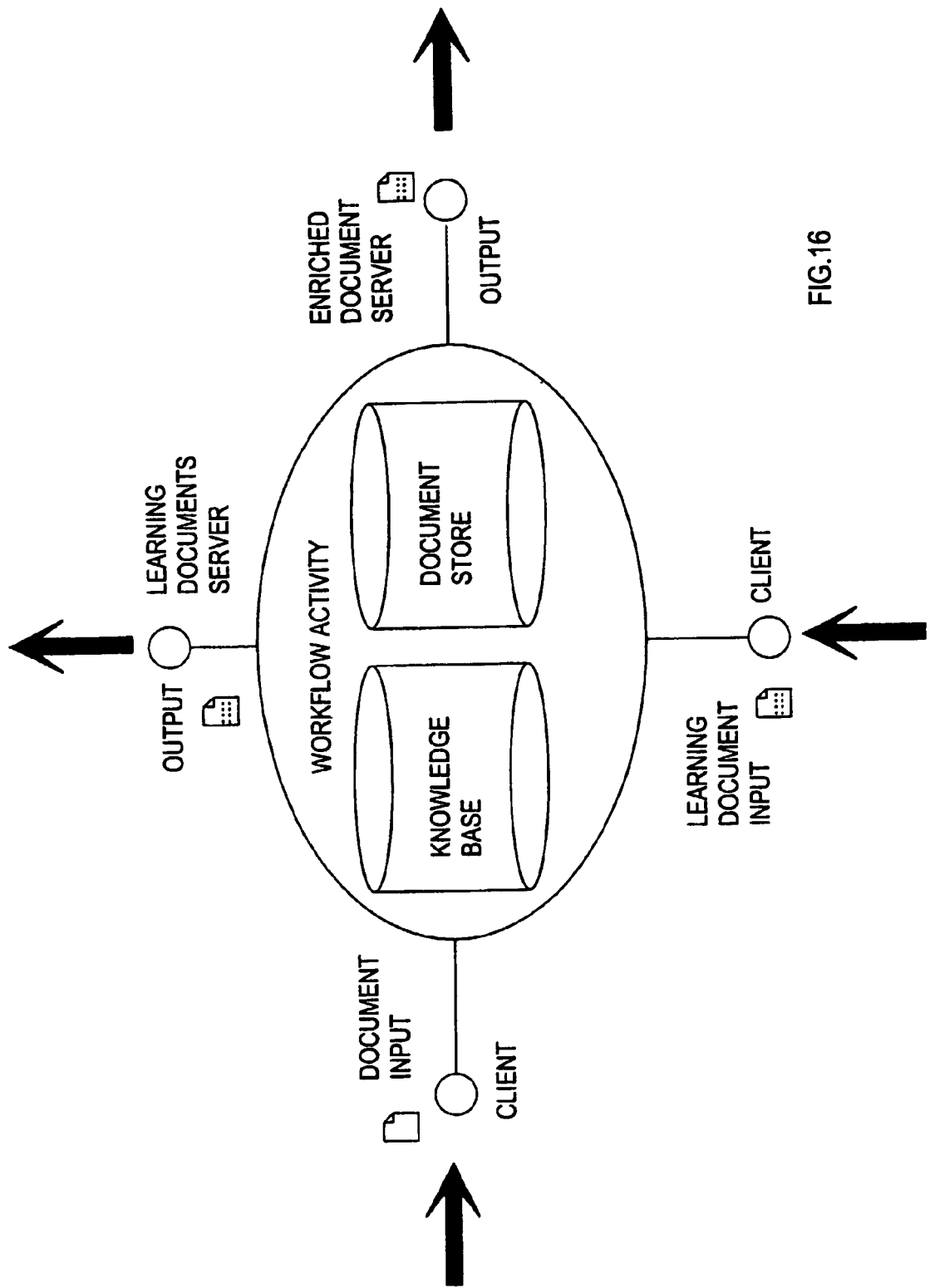
FIGS. 16 to 19 illustrate various workflows of an adaptive multi-level multi-flow semantic enrichment process of the present invention.
Figure 16B:
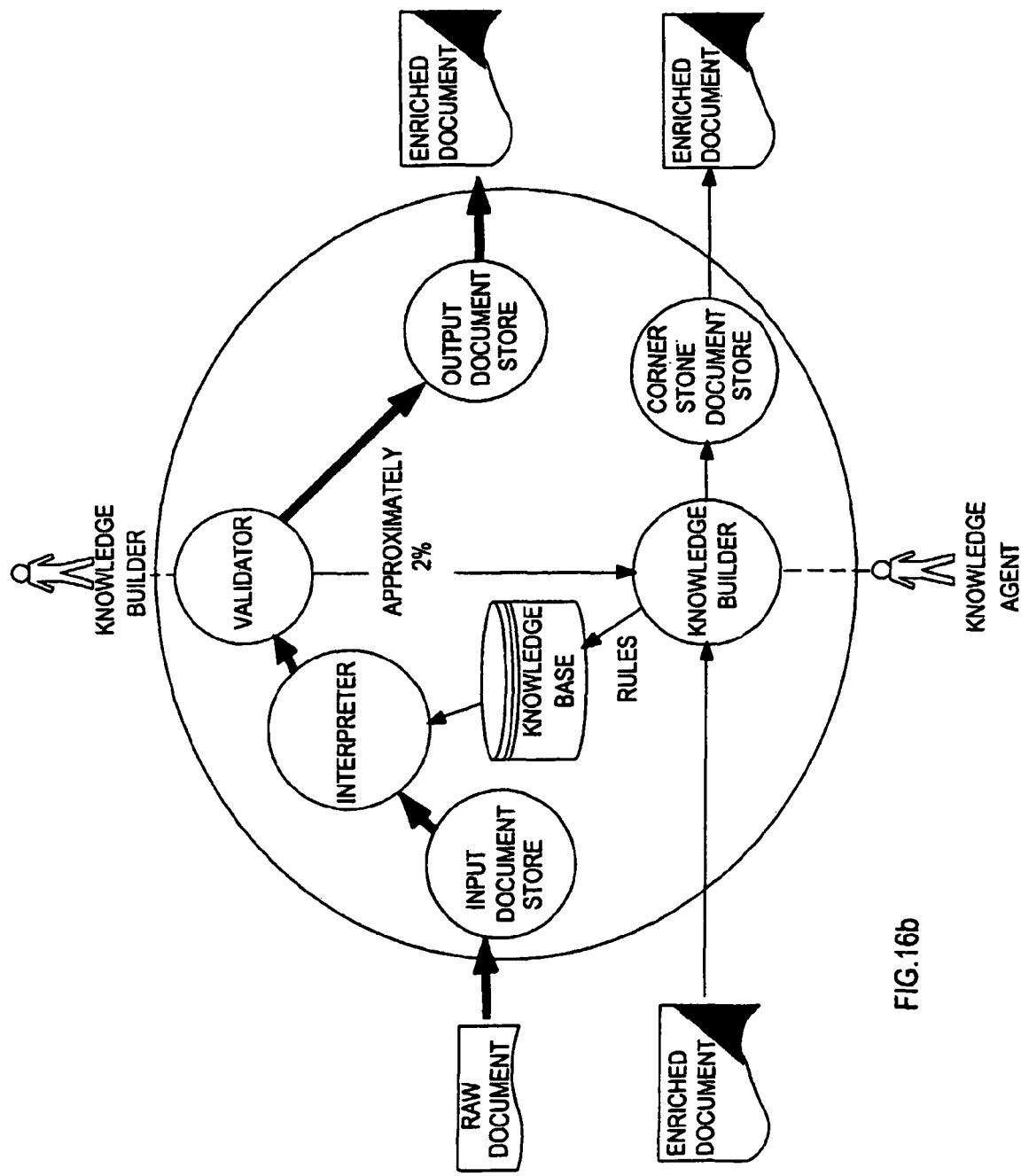

Hence, FIG. 16 illustrates there are four ports on an activity: input documents, output enriched documents; input enriched learning documents and output enriched learning documents. The workflow activity has a knowledge base store and a document store for holding its knowledge, example documents and temporarily or permanently holding input and output documents.

These ports can be implemented in a client-server model or other system network models such as peer-to-peer. In a server model a workflow activity would act as an enriched document server, so the enriched output of the subject matter expert would be provided to other document customers. The output learning documents can also be served as a specialist service, since they are a subset of all enriched documents output by the activity.

Figure 16C:
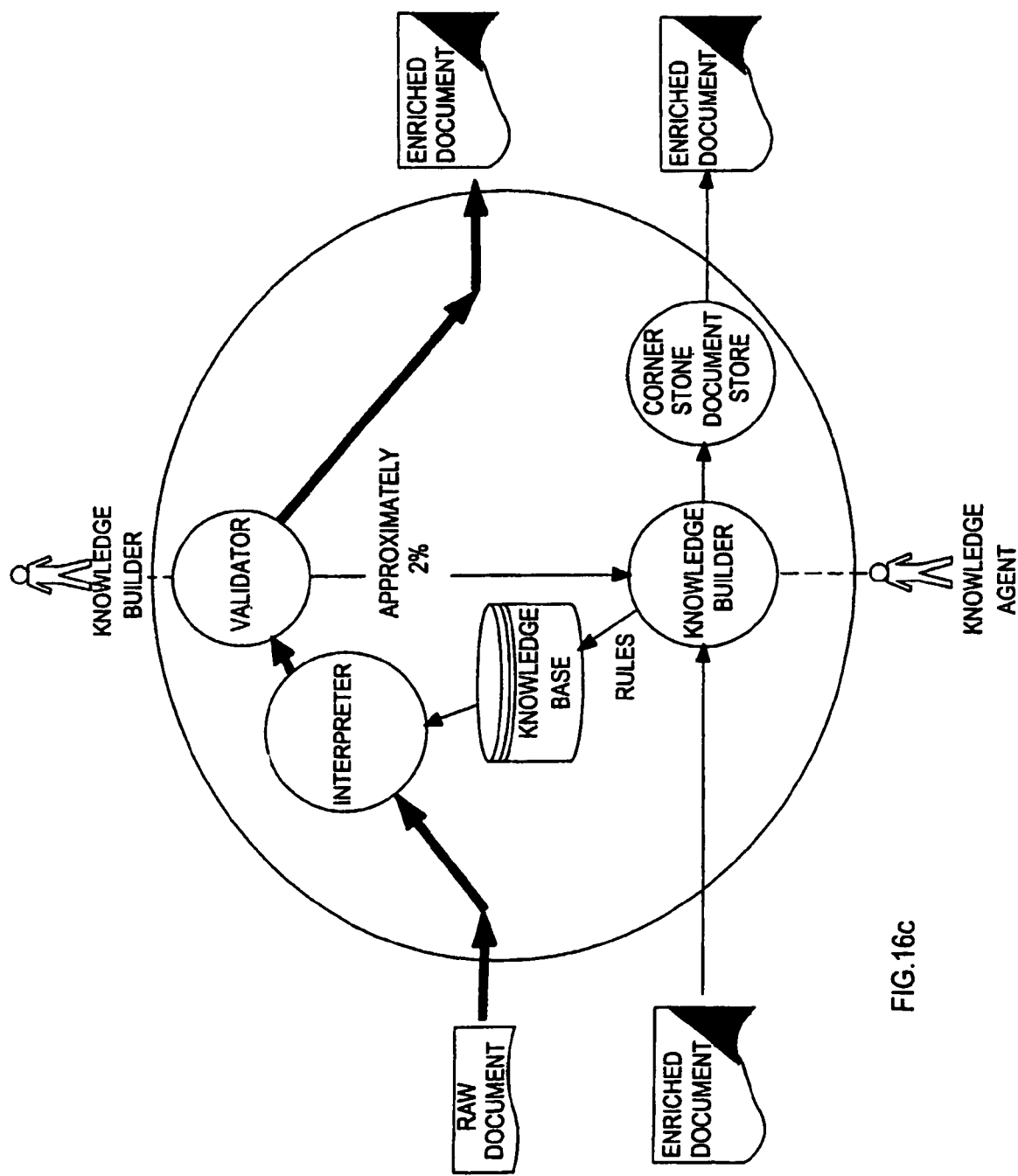

An example of a more detailed workflow activity can be seen in FIGS. 16b and 16c. 15c illustrates that document stores can be optional, and that the activity can optionally pull data on demand from other systems. Further the coupling of the sub-components can be as loose or tight as needed. The main requirement is that some feedback loop in the form of interpret, validate, rule build, interpret is established.

Figure 17:
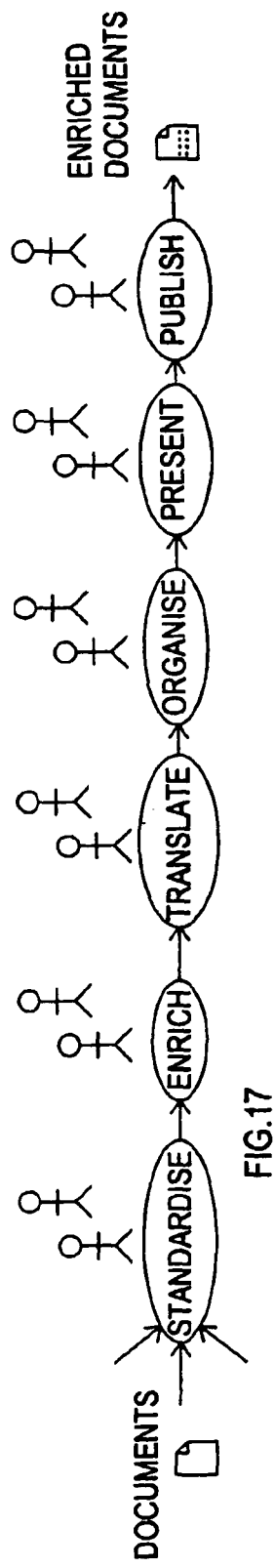
Figure 18:
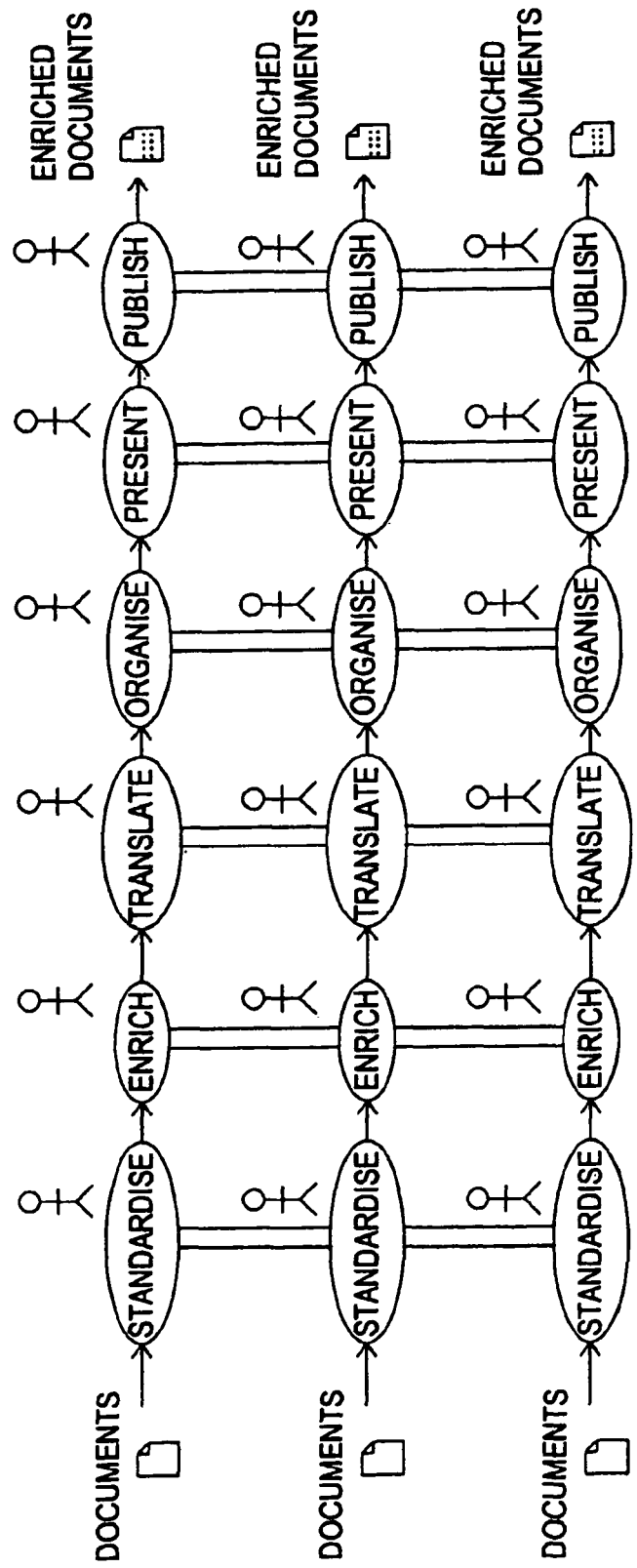

A subject matter expert can register their activity as taking input documents from other activities (output server) to provide multi-stage enrichment such as in FIG. 17 or in FIG. 18. These learning documents can be accessed on demand or subscription.

The learning document input and output ports of an expert's activity can be connected to the output and input ports of another expert's activity performing the same or similar task, or they can be all included in a document repository and all users build knowledge off the same learning documents.

Figure 19:
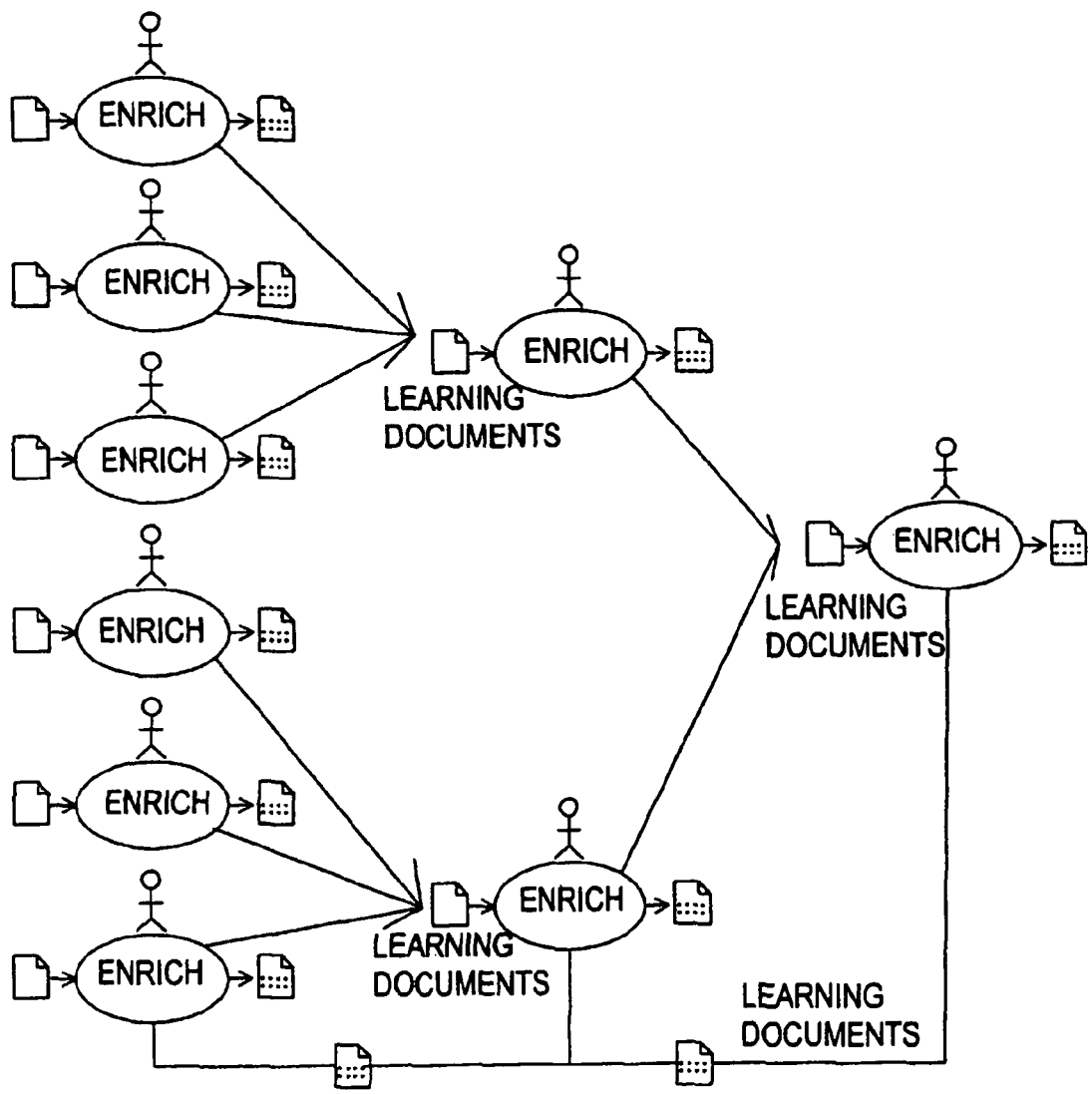

Knowledge is also disseminated by the workflow by passing enriched documents through the network. Users can read the enrichment of previous users and the reasons for that enrichment, hence users can learn about earlier stages of processing. Further, the system can look forward in the workflow by requesting enrichment of succeeding nodes in the workflow network. The main difference is that this forward-looking work is not yet approved, but is a very accurate view of the final enrichment stages. For example, in the work flows in FIGS. 18 and 19, a person in the enrichment stage, can see the earlier approved standardised document, as well their own enriched document, but further can see the document translated into other languages, organised into hierarchies, or a presentation or publication view of the final document.

Figure 20:
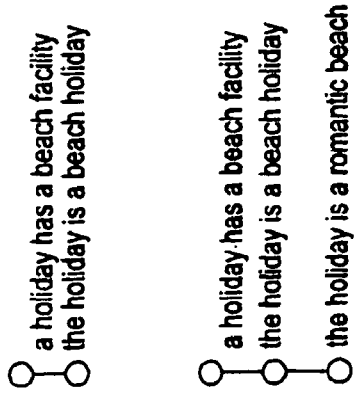
FIGS. 20 and 20a show respectively document edits and document translations as a ripple down rule tree in accordance with the present invention.

FIG. 20 shows how enrichment activities can be arranged into a hierarchy where learning documents from each activity are sent to a supervising subject matter expert. This is done by connecting the output learning document server port of the supervised user to the input learning port client of the supervisor. The supervisor can than take the enriched document with its reasons as a suggestion to modify her knowledge base. These suggestions can be accepted or further refined. These accepted or refined enriched documents can then be broadcast back to the supervised activities, where they can automatically be accepted or refined further if needed. Accepting an enriched document in the same enrichment domain of subject matter expertise results in the knowledge base being updated, and hence applying to further documents automatically.

Alternatively, in a hierarchical or supervised model, the supervised enrichers do not need to create formal rules but can simply edit or correct their documents that have been auto-enriched. This could optionally give a short natural language reason for the change if they wished. These documents still count as learning documents. The supervisor would then only need the higher level of skill to create more formal rules.

Once the supervisor has then made a formal enrichment rule from the learning document, this document with its formal rule can be sent back to the supervised enrichers for automatic inclusion in the knowledge base.

As well as this workflow approach a single database can be used in this model, where edited, approved views of documents can be produced for managing this flow.

Editing operations on documents can be classified into several kinds: translating, enrichment, switching. Translation replaces a source document's content with new content in the target document. Enrichment adds summary concepts to a document. Switching makes some decision about directing a document to a target activity or destination.

Figure 20A:
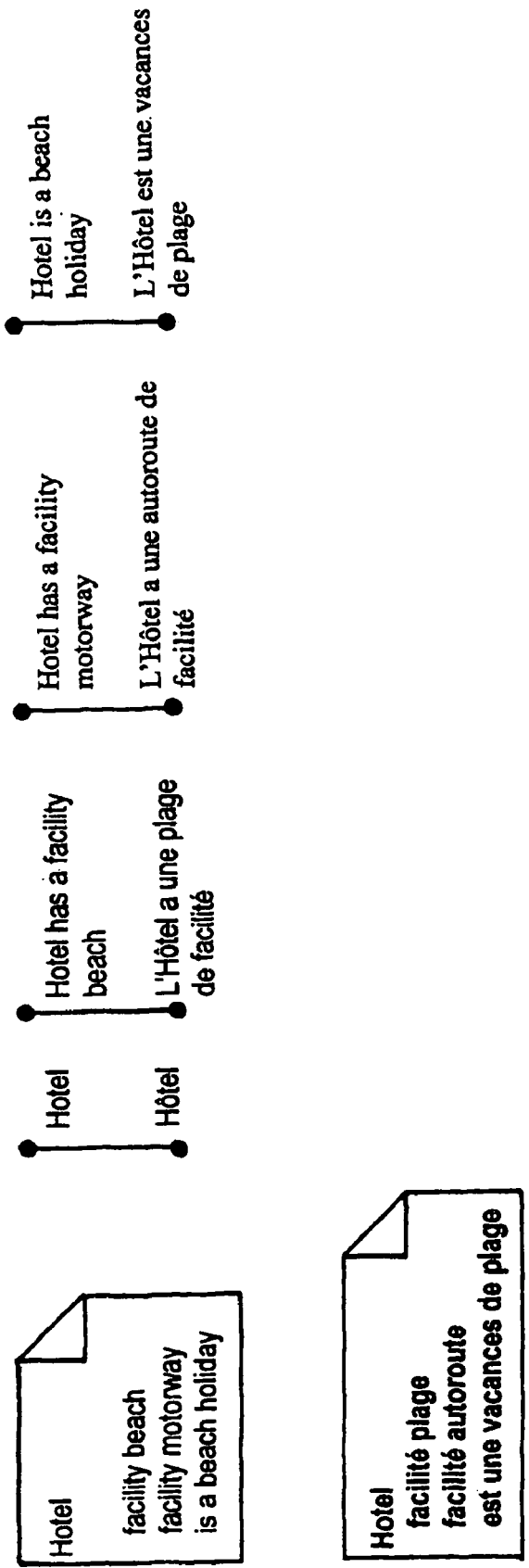

For example, FIG. 20a shows possible edit operations in a translation activity. Some content such as that a holiday has a beach facility could be translated into a holiday facility of a plage if the translation activity is translation from English to French. Alternatively, a piece of content may be omitted by not making a transformation rule for it. So if the translator wants to omit that a holiday has an ironing facility, then they simply do not make a rule. Multiple pieces of content can be merged into a single translated concept. Similarly, a piece of content such as "swimming pool and gym," could be split into separate translated facilities piscine and gym.

In interpreting a document, users are typically adding new enrichment, removing some enrichment, or modifying a piece of enrichment. For example, a user may add some enrichment that a holiday is a "hot beach holiday" if the holiday has beach facilities as in FIG. 20. They may modify such an enrichment to "romantic beach weekend" if the document contains information that the weather is not hot. Similarly, they may remove it all together if they so wish.

Enrichment can be used to control the workflow itself, as users can register for categories of documents of interest and previous activities can classify documents into the various categories. The enrichment can also be operations on documents or categories of other documents or activities themselves. This allows adaptive workflow where documents are dynamically classified, enriched and transmitted to various activities.

These edits are recorded as rules. Some attributes and values of the document are selected for the edit. Alternatively, negative conditions about some other learning document are given. If the enrichment was a newly added piece of information for the document, then the conditions added are the full rule. So for example, in the example for hot beach holiday above, when the condition of holiday has a beach facility, then the full rule is "if a holiday has a beach facility, then the holiday is a beach holiday".

If the enrichment is modified to romantic beach weekend because it is winter, then the full rule is "if a holiday has a beach facility and it is winter, then the holiday is a romantic beach weekend." also the other rule is modified to "if a holiday has a beach facility and it is not winter, then the holiday is a beach holiday." Removing the enrichment behaves similarly to modifying enrichment, except no conclusion is made in the "then" part of the rule.

These rules are best captured in a rule tree, decision tree or ripple down rule tree. The rule for a beach holiday would have a child rule of romantic beach weekend. A sibling rule could then be added that if the holiday has a fitness centre, then it is a sporty beach holiday. This simple structure allows large complex rule bases to be encoded and built efficiently.

FIG. 20 illustrates the relationship between document edits and a ripple down rule tree or equivalent psuedo-code that can be compiled into a computer program. These rules can be included with each enriched document in general as well as specific learning documents. This allows subject matter experts to learn from each other, by sharing knowledge about enrichment. Further, this allows rapid training of new staff in an organisation, as the organisations cumulative knowledge is actively enriching documents and educating staff at a very fine grain level. Current best practice is for information technology personnel to program this knowledge into some computer software. This suffers from several problems. The first problem is that IT person must gather the knowledge from subject matter experts. The second is that once encoded in a computer program, the knowledge is no longer visible to the subject matter experts or new staff, so will suffer from maintenance issues and has no training value.

FIG. 20 shows how a rule tree is constructed from a session of editing 3 documents. The rule tree could then be run as an editing program on the documents or similar documents. This is the auto-enrichment process that subject matter experts then approve or refine. As the rule tree is built up, the auto-enrichment is shown in bold at each step, the user may strike-out (remove) the enrichment and replace with another enrichment as shown in bold font.

It is to be understood that the present invention may be embodied in a computer program comprising code positions which when loaded and run on a computer cause the computer to carry out the method of the present invention as claimed in the attached claims.

Furthermore the present invention may be embodied in a computer program comprising code portions which when loaded and run on a computer cause the computer to comprise a search engine as claimed in any one of the attached claims.

The semantic search engine of the present engine may comprise a computer arranged under the control of software for performing the steps of the method claimed in any one of the attached claims.

The present invention may be embodied in a computer program product comprising a machine readable data carrier carrying as computer program as claimed in the attached claims.

Some of the above ideas and techniques can be stated more generally and in some cases used more generally. As will be apparent to those skilled in the art at least some parts of the invention may be used independently as well as part of a search engine.

In particular the present invention provides a unique way for associating rules with documents and optionally applying those rules to the documents to modify the documents. The modifying can be the enrichment of the document by adding compound words to help with searching or more generally anything prescribed by the rule. Other examples include changing the content of the document to advertise current special others or tailoring the document to particular user. The rules may be associated with and applied to a document in real time as the document is prepared for delivery to a user. This capability is provided for by the speed achieved in finding the appropriate rule or rules for the document. In the present invention rather than applying a whole rule base to a document as would be conventional, the document drives the query. The components of the document are analysed and it is determined whether there is a rule associated with each component. Once this is determined the most document component specific rule or rules are found and applied.

A more detailed description of this process is given below with reference to FIGS. 21, 22A and 22B.

FIG. 21 schematically shows rules stored in ripple down rule trees in a rule database. In FIG. 21 for the sake of simplicity only three sets of rules 2110, 2120 and 2130 are shown, but in reality a rules database will include a large and typically ever increasing number of rules relating to a wide variety of subjects. In the present example the three sets of rules shown relate to holidays (2110), wine (2120) and cameras (2130). The rules relating to holidays will only be relevant for processing documents to do with holidays, those relating to wine only relevant for processing documents to do with wine and so on. In the present case an example is explained where processing is of a document to do with holidays and therefore the detail of the rule sets concerning wine and cameras 2120, 2130 is not fully developed or explained in detail. These rule sets 2120, 2130 are merely included in FIG. 21 to illustrate the principle that the rules database can include rules concerning a wide range of different subject matter.

The set of rules relating to holidays 2110 is based closely on the set of rules concerning holidays shown above in FIG. 20 and explained in reference to FIG. 20. Again this is being done simply for the sake of convenience. It will be clear that the rules relating to holidays 2110 and all other rules sets 2120, 2130 and so on can be created or at least supplemented, modified and updated, via the process explained above with reference to FIGS. 20 and 20A. That is to say in general terms these rules trees and hence the whole rule database may be created and/or maintained by virtue of the actions of rule editing users. The users act by editing documents, providing reasons for these edits and confirming that created rules should be committed to rules database. On the other hand a rule capture module (which is a computer operating under the control of appropriate software and above forms part of the search engine) performs the functions described above in relation to FIGS. 20 and 20A and so monitors the amendments made to documents, requests and records reasons or justifications for these amendments, generates rules making use of the amendments and the reasons given, and presents to the rule generating user at least one document enriched using a created rule and then seeks approval of the amendment made to the enriched document and hence approval of the rule from the rule generating user. If such approval is forthcoming then the rule is committed to the database. Alternatively, the user may further modify the enriched document or strike out the enrichment which can have the effect of disapproving the rule and possibly generating a modified rule, an additional rule, or just ensuring no rule is added to the rule database.

If an enrichment is modified, a more specific rule is added under the rule that was used to generate the enrichment. If an enrichment is deleted, a more specific rule is added under the rule that was used to generate the enrichment. In the modification case, the conclusion part of the rule adds to the new enrichment (change) to the document. In the deleted case, no enrichment is added as a consequence of the rule. That is, it is a no-op. When adding a new enrichment not in the document, then a new rule is added as a branch.

Figure 21A:
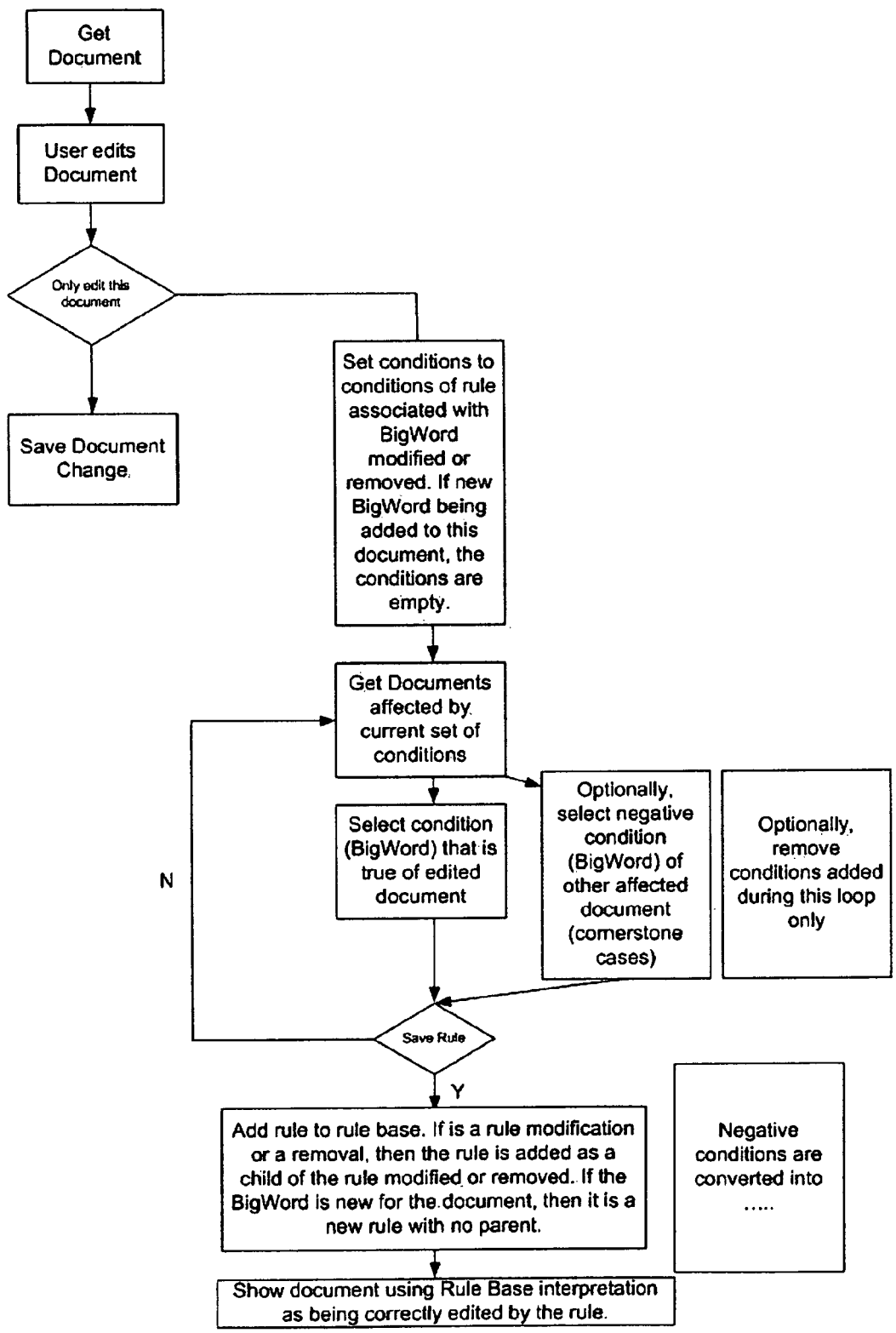
FIG. 21A shows a flow chart showing a process for generating a ripple down rule tree.

FIG. 21A is a flow chart showing one specific process that may be followed in generating a rule tree such as this.

Generally it is preferred to display the actual enriched text of an enriched document to the user when seeking approval of a rule. In alternatives a summary of affected documents such as a list of affected documents, or classes of affected documents or summaries of attributes of affected documents may be displayed to the user in alternative to or addition to the actual enriched document(s).

It will be seen that the range of subjects dealt with by the rule trees will be as broad as the range of documents held in the database which are modified by rule generating users as the rule capture module generates and stores rules in dependence on the actions of the rule generating users.

Whilst the above method for generating a rules database is particularly preferred as it gives rise to a highly scalable system, this is not the only way that such a rules database could be generated. It is simply the preferred way to generate such a rules database if this is to be constantly modified and updated and to be and remain highly accurate.

Once such a rule database is in place, there is an issue of selecting rules to process other documents. It is preferable if this processing is fast enough to happen in real time/on the fly such that as a document is called or selected by a user, the rules database can be accessed and appropriate rules applied to the document to enrich the document for supply to the user. There are many forms which this enrichment can take and this form is determined largely by the content of the rules which are to be associated with a given document.

Figure 22A:
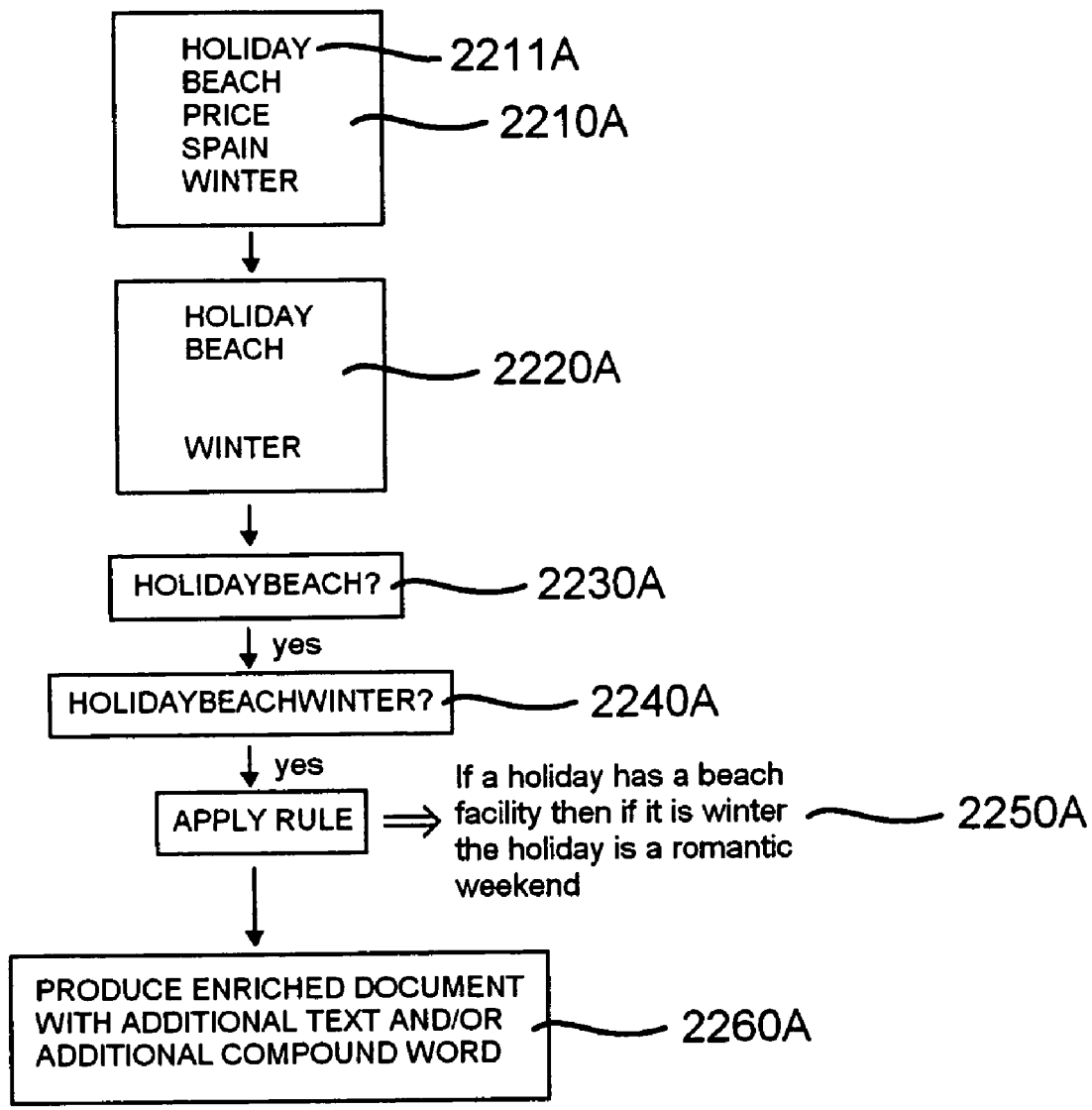
FIG. 22A schematically shows processing of an included document to find rules to associate with the document.
Figure 22B:
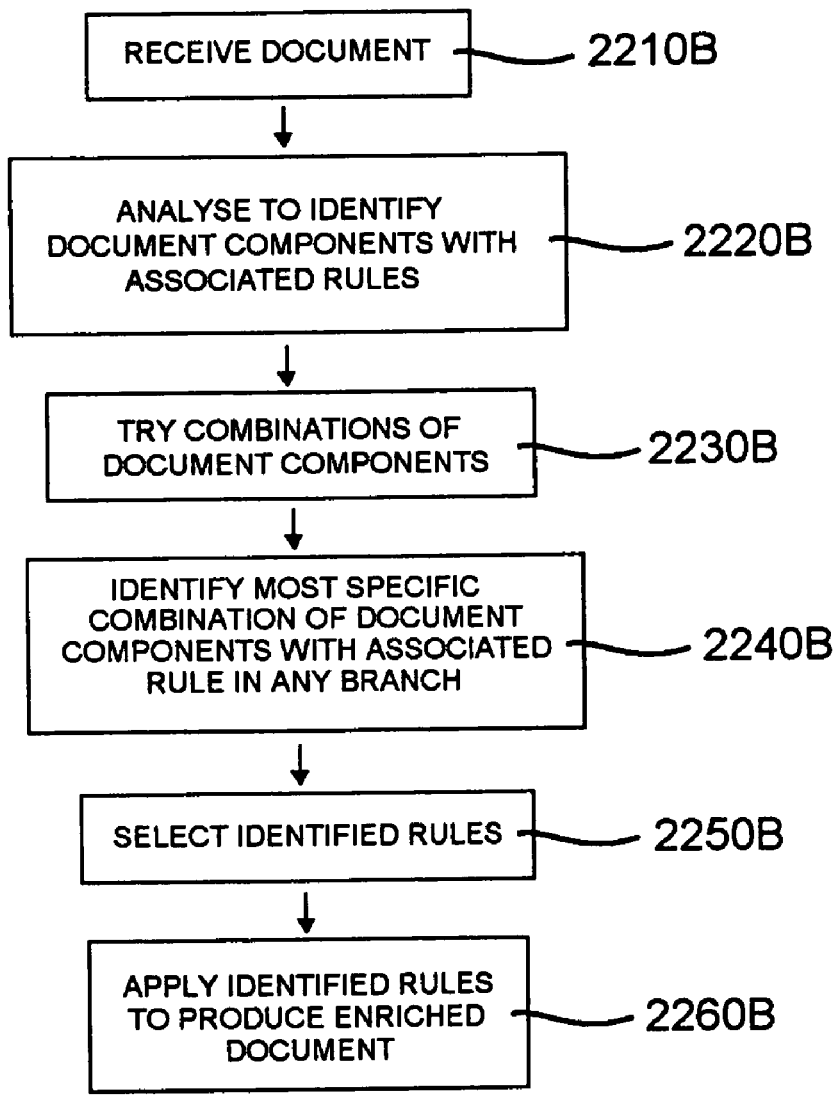
FIG. 22B schematically shows a process for associating rules with a document.

FIGS. 22A and 22B illustrate the process carried out in the present invention for selecting and applying rules in the rule database to a document. FIG. 22A shows the process in a schematic form in relation to a document concerning holidays and using the rule database illustrated in FIG. 21.

The process illustrated in FIGS. 22A and 22B is carried out by a computer controlled by software and in the embodiments described above, this is part of the search engine 10 which implemented in software on a suitable computer. In other embodiments, however, there may be a separate rule search module which is a stand alone component again implemented in software on a suitable computer, but perhaps used separately from a search engine and used with its core functionality to associate rules with documents and therefore facilitate operation on those documents by those rules. The rule search module may co-operate with an enrichment module to generate the enriched documents; the enrichment module applying the rules found by the rule search module.

In FIG. 21, as well as the condition and results which make up the rules illustrated in FIG. 20, the relevant compound words associated with each rule are also illustrated in square brackets. Thus the first in the set of rules concerning holidays (2110) has associated with it the compound word "holiday", the next node, the compound word "holiday beach" and so on. In a more generalised form, what is important is that some type of document component, in this case embodied by a compound word is associated with each node of the rule tree. These compound words are those used in the rule. Thus the second node has the compound word "holiday beach" associated with it because the rule associated with that node is "if a holiday has a beach facility, then . . . ".

In a similar way, rules concerning the compound words "wine", "wine colour red", "camera digital" and so on would be found in the other rule trees 2120, 2130.

FIG. 22A schematically shows a document 2210A (which might be a web page) concerning a holiday. This document 2210A comprises a plurality of document components 2211A which in FIG. 22A are represented by the words "holiday" "beach", "price", "Spain" and "Winter". These document components can be compound words or other appropriate components such as real text words, metatags or any component which is the fundamental component on which the corresponding rule tree is based. As the rule tree in the database shown in FIG. 21 in this embodiment is based on compound words, these document components 2211A are also compound words.

A first step of the procedure of the particular example shown in FIG. 22A is to identify that in the rule tree shown in FIG. 21 there is a rule associated with the compound word "holiday", there is a rule associated with the compound word "beach", there is no rule associated with the compound word "price", there is no rule associated with the compound word "Spain", and there is a rule associated with the compound word "Winter". This then moves us onto a position where in effect there is a cut down document including just those compound words which have been identified as having a rule associated therewith. This situation is illustrated in the form of a modified document 2220A in FIG. 22A. The next stage of the process is to try combinations of the compound words to see whether there are rules associated with those combinations. Thus in the present process first of all it is determined whether there is a rule associated with the combination "holiday beach" in step 2230A. In this case, there is such a rule, so it is then considered in step 2240A whether there is a rule associated with the combination "holiday beach Winter" which again there is, and at which stage all of the compound words found to be referenced in the rule tree have been used and combined together. At this stage the combining process stops and the rule tree can be directly accessed to retrieve the rule which makes use of the combination of compound words "holiday beach Winter" in step 2250A. This means that the rule "if a holiday has a beach facility, then if it is Winter the holiday is a romantic weekend" can be accessed and associated with the document in step 2250A. Once this rule has been found and associated with the document 2210A, it can be used to produce an enriched document in step 2260A. The exact form of the enriched document can be determined by the rule itself, thus for example, the enriched document may include the additional text "this holiday is a romantic weekend" and/or have the additional compound word "romantic weekend" added to its structure and/or have the compound word "holiday beach Winter" added to it.

Whilst the process schematically illustrated in FIG. 22A shows the application of one rule which was relevant to the document 2210A, it is possible that the rule database will include other rules which are relevant. As an example, there might be another rule which specifies that if a document relates to a holiday in Spain, then a foreign exchange deal on Euros should be offered to the user. Such a rule would be appropriate to document 2210A (due to the presence of compound words "Spain" and "holiday") and could be used to result in an enhanced web page being sent to the user which was based on document 2210A, but also included an advert offering an exchange rate deal on Euros.

Of course, the number of rules in the rule database and the different forms in which enrichment can occur are almost endless.

The process carried out by a computer or appropriate set of computers in following a process such as that illustrated in FIG. 22A is shown in more general terms in a flow chart shown in FIG. 22B.

In a first step in the procedure 2210B, a document is received for processing. In a second step 2220B, the document is analysed to identify document components, for example compound words, which have rules associated with them in the rules database. In a third step 2230B different combinations of the identified document components are generated and tested against the rule database to see whether there are rules associated with each combination. In the example described above with reference to FIG. 22A this was a relatively simple process as the first set of combinations tried led to all of the compound words being used. However, it will be seen that in other circumstances there may be some combinations which have no rule associated with them in the rule database and there can also be a number of different unique combinations which may have associated rules. All of these rules may be associated with the document. In trying the combinations and associating the rules with the document the objective is to find the most specific rules that apply for a document. That is to say the object is to find the rules associated with the numerically largest combination of document components from the document. Where a tree has many different branches with different associated document components, the methodology is to find the rule associated with the most specific combination of document components in each branch.

That is to say, to take the example of the set of rules 2110 in FIG. 21, the rule associated with "holiday beach" would not be chosen in respect of the document 2210A because a rule having a more specific combination of document components associated with it exists, i.e. the rule associated with the combination "holiday beach Winter". If the same document also included document components "wine" and "colour red", then the rule associated with the combination "wine colour red" would also be chosen, but not the rule associated with "wine". This approach of trying combinations of document components (for example combinations of compound words or sub-compound generalised words) and identifying the biggest or most specific combination of document components for which there is a rule in the database in each branch and then associating the relevant rule (or rules) with the document leads to a particularly efficient way of making use of what can be a very wide set of rules in the rule database.

This step of identifying the most specific combination of document components with an associated rule in any branch of the rule tree is a fourth step of the process 2240B.

Once one or more appropriate rules has been identified in the fourth step these are selected in the fifth step 2250B. A sixth 2260B is to apply the identified rules to produce an enriched document which is the document received in step 2210B enriched on the basis of the rule or rules selected in the fifth step 2250B.

Figure 22C:
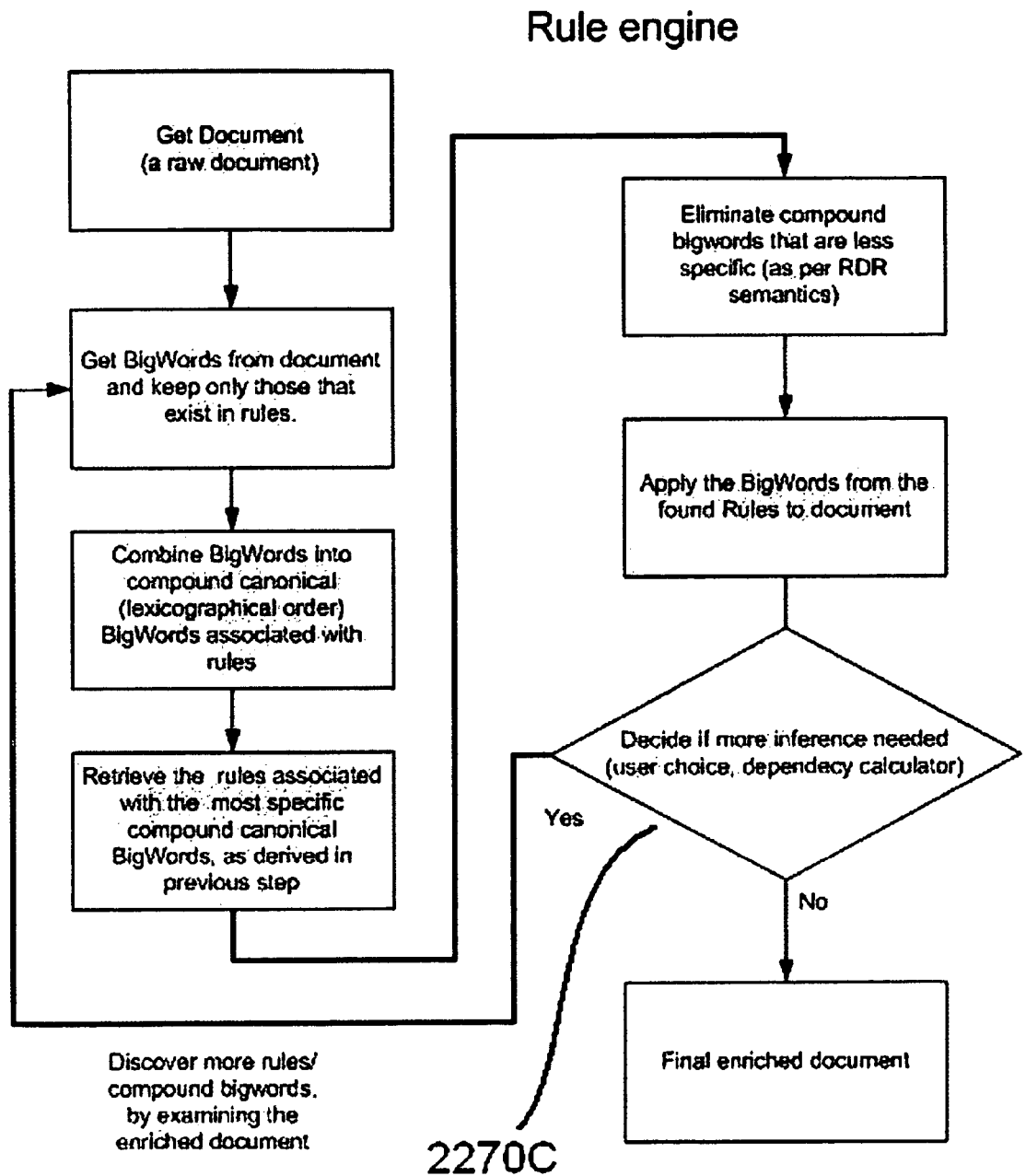
FIG. 22C shows a flow chart showing a specific implementation of a rule search and application process.

FIG. 22C shows a specific implementation of the type of process described above in relation to FIG. 22B using language which is more specific and is familiar to those skilled in the art. The process of FIG. 22C includes steps corresponding in general terms to those of the process of FIG. 22B and an additional step 2270C of deciding whether more processing is required after an initial run through those steps. That is, deciding on the basis of a user input—which may involve the step of asking a user if more enrichment is required and acting on the response, or deciding on the basis of a computation— for example the output of a dependency calculator, whether the preceding steps in the process should be carried out again by first examining the enriched document developed as a result of the first run through the process.

What is claimed is:

1. A method of retrieving documents from a database comprising the steps of:
   a. semantically editing a document to create at least one searchable compound word that contains information contextually relevant to the contents of the document;
   b. associating the at least one compound word with the document thereby to produce an enhanced document;
   c. storing the enhanced document in an enhanced document database;
   d. providing a semantic query editor that is operable to receive a query input by a searcher, and using said query editor being operable to convert the query into at least one query searchable compound words, that contains information contextually relevant to the query;
   e. providing a search means to search the enhanced document database, searching the enhanced document database to match the at least one query searchable compound word with compound words associated with a document and thereby locate specific documents in the database containing the at least one compound search word; and f. presenting the specific documents to the searcher, wherein there is provided a semantic rule engine that is operable to generate and store rules each of which includes at least one compound word derived from at least one of the enhanced documents, and the method comprises the further steps, prior to step (f), of semantic searching a selected enhanced document to generate at least one searchable compound word associated with the selected enhanced document, searching the rules to find at least one rule specifying the at least one searchable compound word and at least one additional compound word to generate a set of candidate rules as rules which are possibly relevant to the selected enhanced document, and processing the set of candidate rules and adding to the selected enhanced document additional compound words specified in at least one of the rules in the set of candidate rules where the respective rule is satisfied for the selected enhanced document.

2. The method according to claim 1 comprising another step of allowing a searcher to select at least one compound word from a plurality of compound words produced in step (d) and conducting step (e) in respect of the selected at least one compound word.

3. The method according to claim 1 wherein step (b) comprises embedding the at least one compound word in the document.

4. The method according to claim 1 wherein step (b) comprises forming a sub-document that is linked to the specific document.

5. The method according to claim 1 wherein there is provided in the method a step of recognising the semantic structure of a document and converting such semantic structure into compound words and their associated sub-compound generalised words for such compound and sub-compound words to be associated with that particular document, employing a second conversion operation for recognising the semantic structure of an input query and translating this semantic structure of an input query into required compound words and their sub-compound generalised words, undertaking a predetermined Boolean query based on a predetermined combination of the compound and sub-compound generalised words associated with the initial query input against the compound words and their sub-compound generalised words associated with each document being searched, subsequently retrieving and temporarily storing those documents having compound words and sub-compound generalised words associated therewith matching the required Boolean search parameters.

6. The method according to claim 1 comprising the step of the semantic rule engine storing the rules in a ripple down rule tree.

7. The method according to claim 1 comprising the step of the semantic rule engine capturing at least some of the rules by recording edits made by rule generating users to documents stored in the database.

8. The method according to claim 7 comprising the step of the semantic rule engine capturing conditions associated with edits made to provide a rule.

9. The method according to claim 7 comprising the step of the semantic rule engine requesting approval from a rule generating user of a generated rule before adding the rule to the rule database.

10. The method according to claim 9 comprising the step of displaying to the user at least one of a document affected by the rule and a summary of affected documents before requesting approval from the rule generating user.

11. A computer comprising a computer program comprising code portions which when run on the computer cause the computer to carry out the method according to claim 1.

12. A semantic search engine comprising a computer arranged under the control of software for performing the steps of the method according to claim 1.

* * * * *